US011692581B2

(12) United States Patent
Buczynski

(10) Patent No.: US 11,692,581 B2
(45) Date of Patent: Jul. 4, 2023

(54) BOX NUT RETAINER

(71) Applicant: ILLINOIS TOOL WORKS INC., Glenview, IL (US)

(72) Inventor: Gregory George Buczynski, Ferndale, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 404 days.

(21) Appl. No.: 16/998,758

(22) Filed: Aug. 20, 2020

(65) Prior Publication Data

US 2021/0054867 A1 Feb. 25, 2021

Related U.S. Application Data

(60) Provisional application No. 62/890,395, filed on Aug. 22, 2019.

(51) Int. Cl.
*F16B 37/04* (2006.01)

(52) U.S. Cl.
CPC ............ *F16B 37/044* (2013.01); *F16B 37/04* (2013.01)

(58) Field of Classification Search
CPC ............................... F16B 37/04; F16B 37/044
USPC ................................................ 411/103, 108
See application file for complete search history.

(56) References Cited

U.S. PATENT DOCUMENTS

| | | | |
|---|---|---|---|
| D274,674 S | 7/1984 | Allen | |
| 5,919,019 A | 7/1999 | Fischer | |
| 6,203,240 B1 | 3/2001 | Hironaka et al. | |
| D477,318 S | 7/2003 | Shiao | |
| 6,629,809 B2 * | 10/2003 | Vassiliou | F16B 37/02 411/173 |
| 6,745,440 B2 | 6/2004 | Vassiliou | |
| 6,893,197 B2 | 5/2005 | Lee | |
| 6,908,274 B1 * | 6/2005 | Vassiliou | F16B 37/043 411/173 |
| 7,120,971 B2 | 10/2006 | Osterland et al. | |
| D537,814 S | 3/2007 | Okada et al. | |
| D538,790 S | 3/2007 | Okada et al. | |
| 7,226,260 B2 | 6/2007 | Jackson, Jr. et al. | |
| D572,580 S | 7/2008 | Machida | |
| 7,399,151 B2 | 7/2008 | Lubera et al. | |
| 7,568,870 B2 * | 8/2009 | Paquet | F16B 37/043 411/125 |
| 7,640,634 B2 | 1/2010 | Vassiliou | |
| D616,851 S | 6/2010 | Roka | |
| 7,789,606 B2 | 9/2010 | Kosidlo, IV et al. | |
| 7,874,775 B2 | 1/2011 | Hullmann et al. | |
| D639,260 S | 6/2011 | Carroll | |
| 8,155,692 B1 | 4/2012 | Roka | |

(Continued)

FOREIGN PATENT DOCUMENTS

| | | |
|---|---|---|
| DE | 202013100387 U1 | 5/2013 |
| WO | 2018144210 A1 | 8/2018 |

OTHER PUBLICATIONS

Extended Search Report, related European Application No. 20192128.5, dated Jan. 21, 2021, 7 pages.

*Primary Examiner* — Roberta S Delisle
(74) *Attorney, Agent, or Firm* — Quarles & Brady LLP

(57) ABSTRACT

A first example box nut retainer includes a support, a fastener sleeve, and a wing. The fastener sleeve defines an opening and extends downwardly from the support. The wing extends from the support and has a top corner between the support and the fastener sleeve.

19 Claims, 31 Drawing Sheets

(56) References Cited

U.S. PATENT DOCUMENTS

| | | | | |
|---|---|---|---|---|
| 8,371,544 | B2 | 2/2013 | Heitmeyer | |
| 8,388,289 | B2 | 3/2013 | Mazur et al. | |
| 8,790,056 | B2 | 7/2014 | Fuentes Domingo et al. | |
| 8,800,120 | B2 | 8/2014 | Benedetti | |
| D715,686 | S | 10/2014 | Crafton et al. | |
| D716,137 | S | 10/2014 | Szymanski | |
| D740,113 | S | 10/2015 | Olenick | |
| 9,284,968 | B2 | 3/2016 | Clouser | |
| D757,533 | S | 5/2016 | Ormsbee et al. | |
| D759,475 | S | 6/2016 | Banno | |
| 9,440,596 | B2 * | 9/2016 | Huelke | F16B 2/241 |
| 9,562,554 | B2 * | 2/2017 | Vidal | F16B 13/08 |
| D782,928 | S | 4/2017 | Takakuwa et al. | |
| D782,930 | S | 4/2017 | Takakuwa et al. | |
| 9,631,650 | B2 | 4/2017 | Wottrich et al. | |
| 9,631,662 | B2 * | 4/2017 | Boyer | F16B 37/043 |
| D787,173 | S | 5/2017 | Parnell | |
| D788,329 | S | 5/2017 | Bizzarri et al. | |
| 9,746,018 | B2 | 8/2017 | Williams et al. | |
| 9,826,810 | B2 | 11/2017 | Singer | |
| D806,529 | S | 1/2018 | Olenick | |
| D808,787 | S | 1/2018 | Kinskey | |
| D818,811 | S | 5/2018 | Hattori | |
| D825,571 | S | 8/2018 | Shannon, III | |
| D838,866 | S | 1/2019 | Keller | |
| D869,265 | S | 12/2019 | Matsufuji et al. | |
| D873,128 | S | 1/2020 | Lu | |
| D874,913 | S | 2/2020 | Buczynski et al. | |
| D879,104 | S | 3/2020 | Li | |
| D879,105 | S | 3/2020 | Li | |
| D888,546 | S | 6/2020 | Buczynski | |
| D891,240 | S | 7/2020 | Buczynski | |
| D891,241 | S | 7/2020 | Buczynski et al. | |
| 2004/0093701 | A1 | 5/2004 | Dickinson et al. | |
| 2006/0254032 | A1 | 11/2006 | Gibbons et al. | |
| 2006/0288543 | A1 | 12/2006 | Lubera et al. | |
| 2008/0286066 | A1 * | 11/2008 | Paquet | F16B 37/043 411/177 |
| 2010/0026028 | A1 | 2/2010 | Smith et al. | |

* cited by examiner

BOX NUT RETAINER

RELATED APPLICATIONS

The present application claims priority to U.S. Provisional Application Ser. No. 62/890,395 filed on Aug. 22, 2019, which is incorporated by reference in its entirety herein.

FIELD OF THE DISCLOSURE

Embodiments of the present disclosure generally relate to a fastening system, and, more particularly, to a box nut retainer system that is configured to securely connect multiple components together.

BACKGROUND

In recent years, retainers have been developed to fasten panels to one another. For example, vehicles include various panels (e.g., sheet metal or polymer) connected to one another to form the body, doors, and interior of the vehicle.

Certain known retainers are configured to fit into an opening defined in a panel. When a fastener is threaded into the retainer, the retainer expands to retainingly engage the panel.

However, these known retainers fit do not tightly engage relatively thin panels prior to or after installing a fastener. Relative movement between the retainer and the panel may lead to misalignment of the fastener in the retainer, rattling noises, and/or wear to the panel.

Therefore, a need exists for a box nut that is configured to remain at a secure fixed position in relation to a relatively thin component, such as a panel.

SUMMARY

In one aspect, an example box nut retainer is disclosed that includes a support, a fastener sleeve, and a wing. The fastener sleeve defines an opening and extends downwardly from the support. The wing extends from the support and has a top corner between the support and the fastener sleeve.

In another aspect, an example box nut retainer is disclosed that includes a support, a fastener sleeve, and a wing. The fastener sleeve defines an opening and extends downwardly from the support. The wing has a kink extending curvilinearly from the support to a top corner between the support and the fastener sleeve.

In a further aspect, an example box nut retainer is disclosed that includes a support, a fastener sleeve, and a wing. The fastener sleeve defines an opening and extends downwardly from the support. The wing has a top extender extending diagonally from the support to a top corner between the support and the fastener sleeve.

Figure 1:
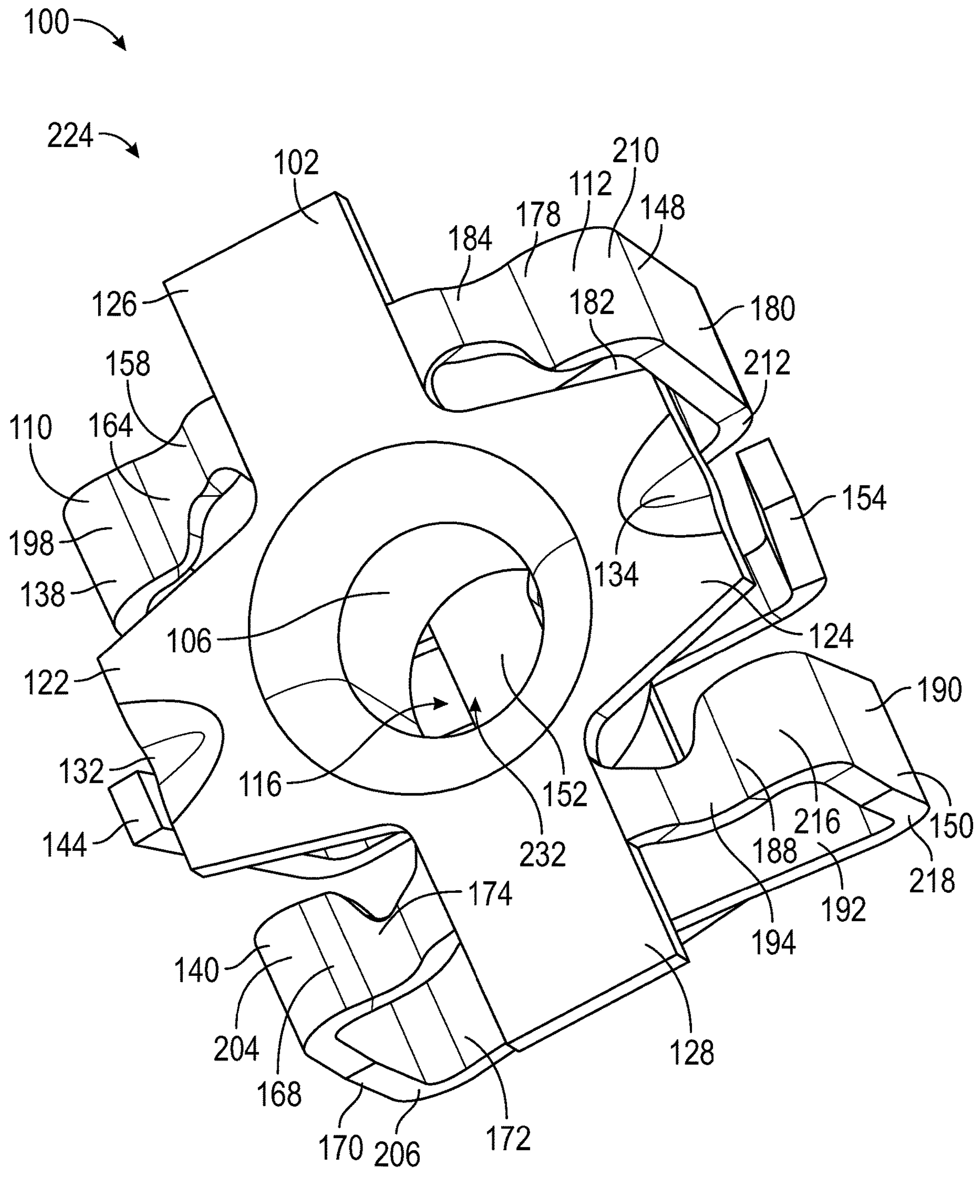
FIG. 1 is an isometric view of a first example box nut retainer according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide first and second box nut retainers with features that facilitate installation of the first and second box nut retainers into relatively thin panels and thus provide attachment points for fasteners to the relatively thin panels.

A first example box nut retainer 100 according to an embodiment of the present disclosure is depicted in FIGS. 1-16. The box nut retainer 100 includes a support 102 that extends a length of the box nut retainer 100. With reference to FIGS. 1-6, 8-10, 12, and 13, the box nut retainer 100 further includes a fastener sleeve 106, a first wing 110, and a second wing 112.

With reference to FIGS. 1, 2, 8-10, 12, and 13, the support 102 and the fastener sleeve 106 define an opening 116. More specifically, the fastener sleeve 106 extends downwardly from the support 102 to define the opening 116. The opening 116 extends through the support 102. The fastener sleeve 106 is centrally positioned relative to the support 102. With reference to FIGS. 1, 2, 7, 8, and 10-12, the support 102 includes a first tab 122, a second tab 124, a third tab 126, and a fourth tab 128. The first tab 122 is opposite the second tab 124. The third tab 126 is opposite the fourth tab 128. The first tab 122 is adjacent to the third tab 126 and the fourth tab 128. The second tab 124 is adjacent to the third tab 126 and the fourth tab 128. Thus, the support 102 is generally cruciform. With reference to FIGS. 1, 2, 8, 10, and 12, the fastener sleeve 106 is interposed between the first, second, third, and fourth tabs 122, 124, 126, 128. With reference to FIGS. 1-4 and 7-13 the first tab 122 includes a first retaining dip 132. The second tab 124 includes a second retaining dip 134. The first tab 122 is longer than the third tab 126 and the fourth tab 128. The second tab 124 is longer than the third tab 126 and the fourth tab 128.

Figure 2:
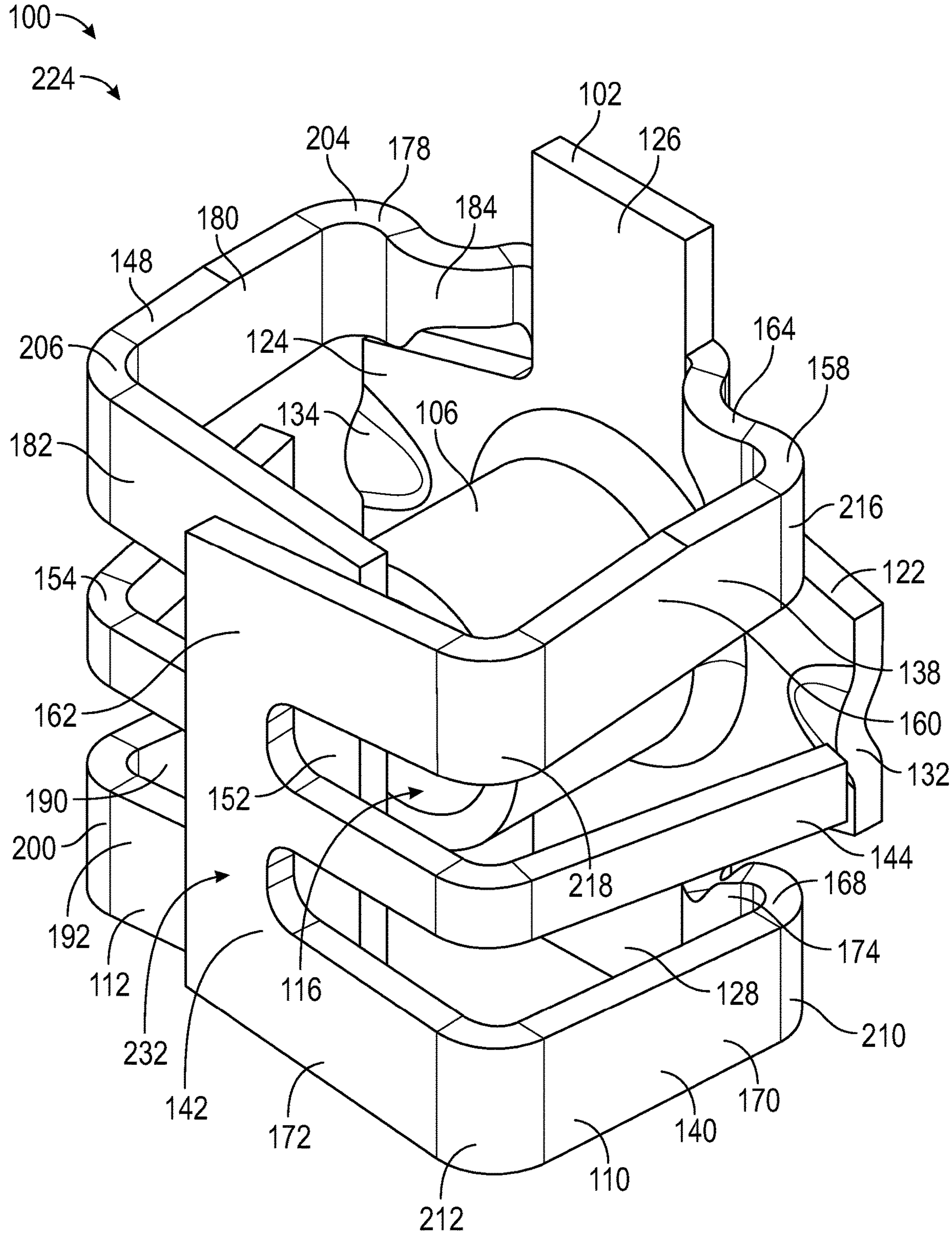
FIG. 2 is another isometric view of the first example box nut retainer of FIG. 1.
Figure 10:
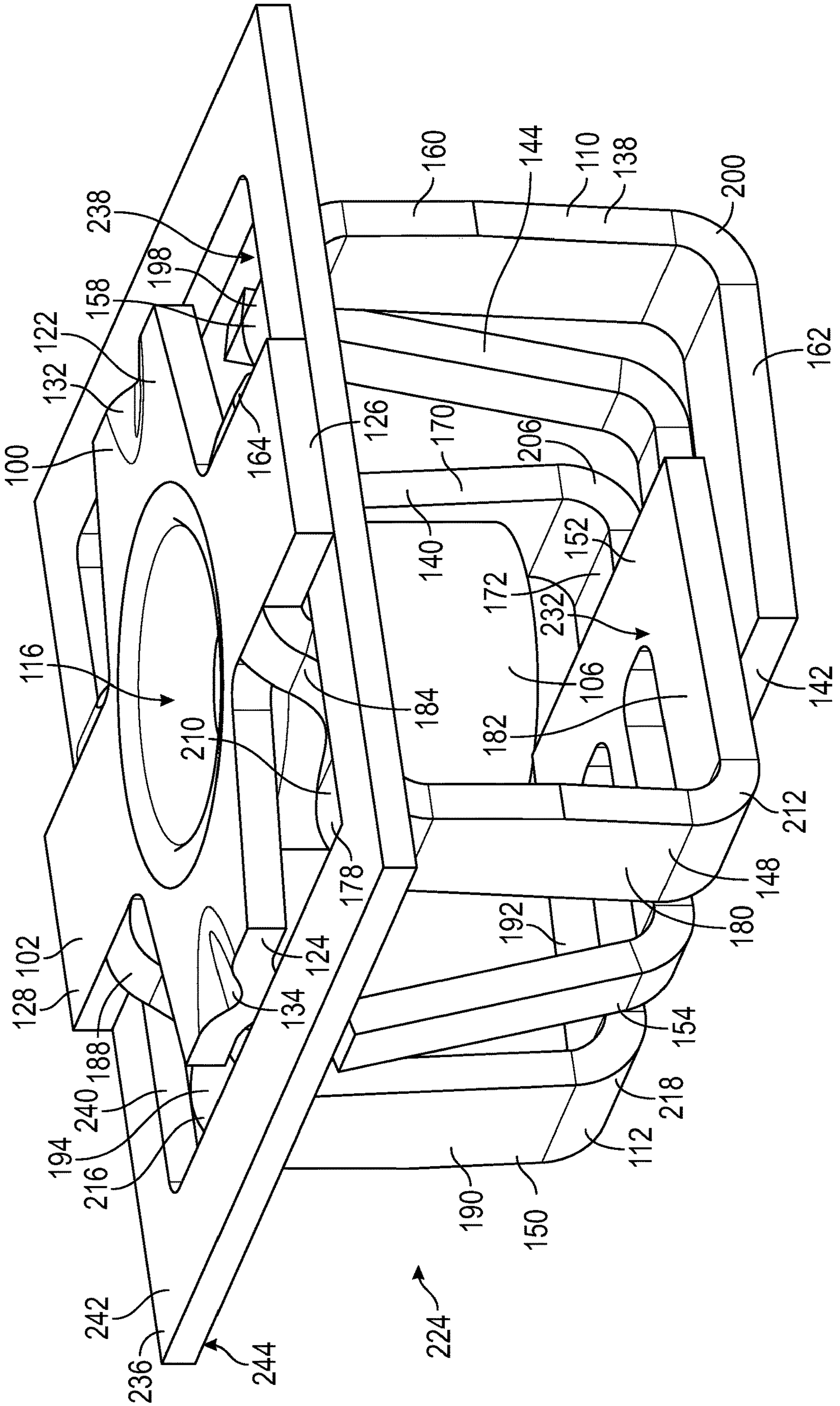
FIG. 10 is an isometric view of the first example box nut retainer of FIGS. 1-9 installed in a panel.

With reference to FIGS. 1, 2, and 10, the first wing 110 includes a first leg 138, a second leg 140, a first connector 142, and a first snap arm 144. The first connector 142 is connected to the first leg 138 and the second leg 140. The first snap arm 144 extends from the first connector 142 between the first leg 138 and the second leg 140. The first leg 138 and the second leg 140 are C-shaped. The first snap arm 144 is L-shaped. The first snap arm 144 extends outwardly and diagonally beyond the first leg 138 and the second leg 140 toward the support 102. The first snap arm 144 extends beyond the support 102.

With reference to FIGS. 1, 2, and 10, the second wing includes a third leg 148, a fourth leg 150, a second connector 152, and second snap arm 154. The second connector 152 is connected to the third leg 148 and the fourth leg 150. The second snap arm 154 extends from the second connector 152 between the third leg 148 and the fourth leg 150 toward the support 102. The third leg 148 and the fourth leg 150 are C-shaped. The second snap arm 154 is L-shaped. The second snap arm 154 extends outwardly and diagonally beyond the third leg 148 and the fourth leg 150 toward the support 102. The second snap arm 154 extends beyond the support 102. The first snap arm 144 and the second snap arm 154 extend oppositely from one another.

With reference to FIGS. 1, 2, and 10, the first wing 110 and the second wing 112 are connected to the support 102 opposite one another. With reference to FIGS. 1 and 10, more specifically, the first leg 138 and the third leg 148 are connected to the third tab 126 opposite one another. Further, the second leg 140 and the fourth leg 150 are connected to the fourth tab 128 opposite one another.

Figure 4:
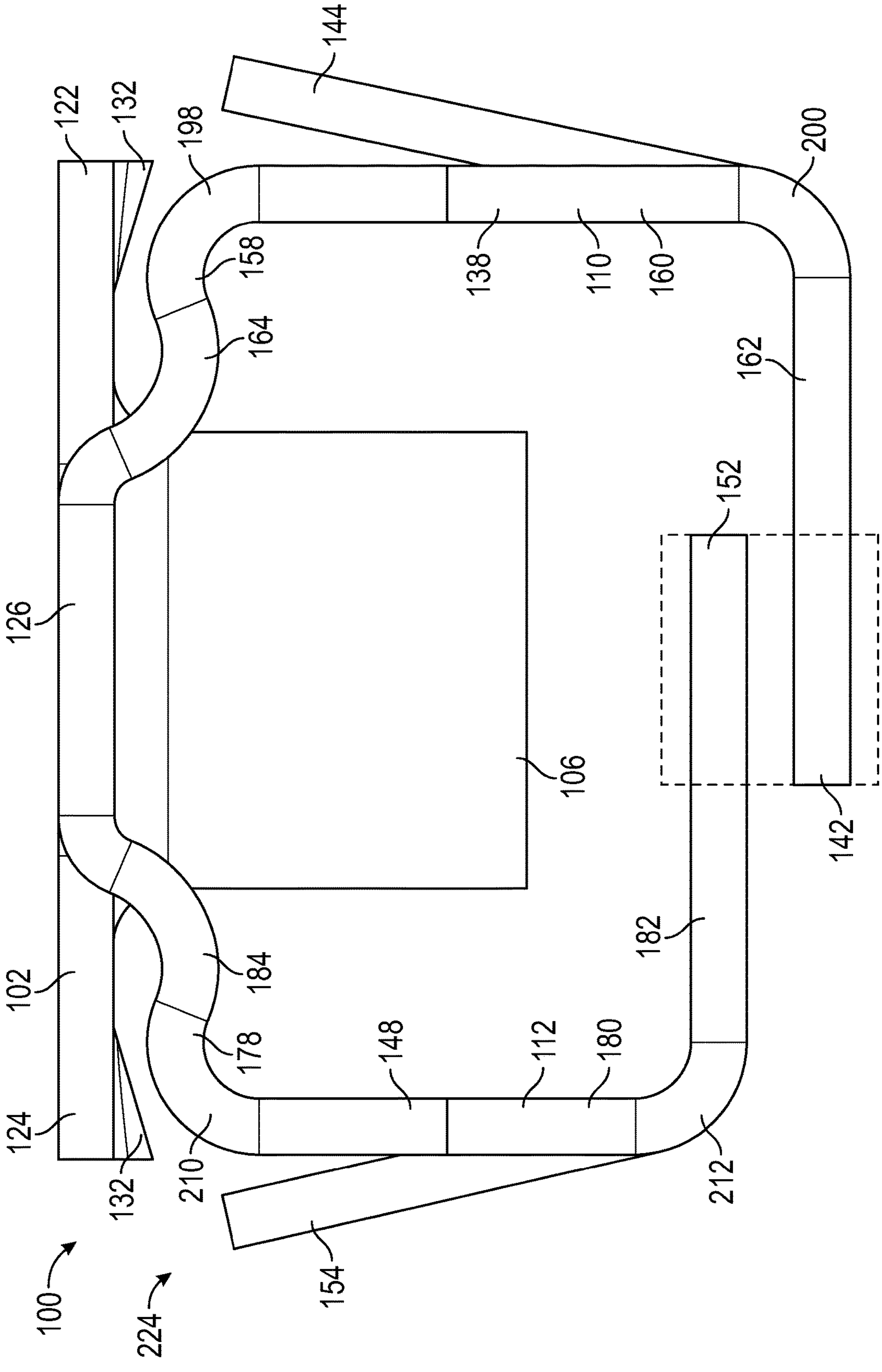
FIG. 4 is another end view of the first example box nut retainer of FIGS. 1-3.
Figure 5:
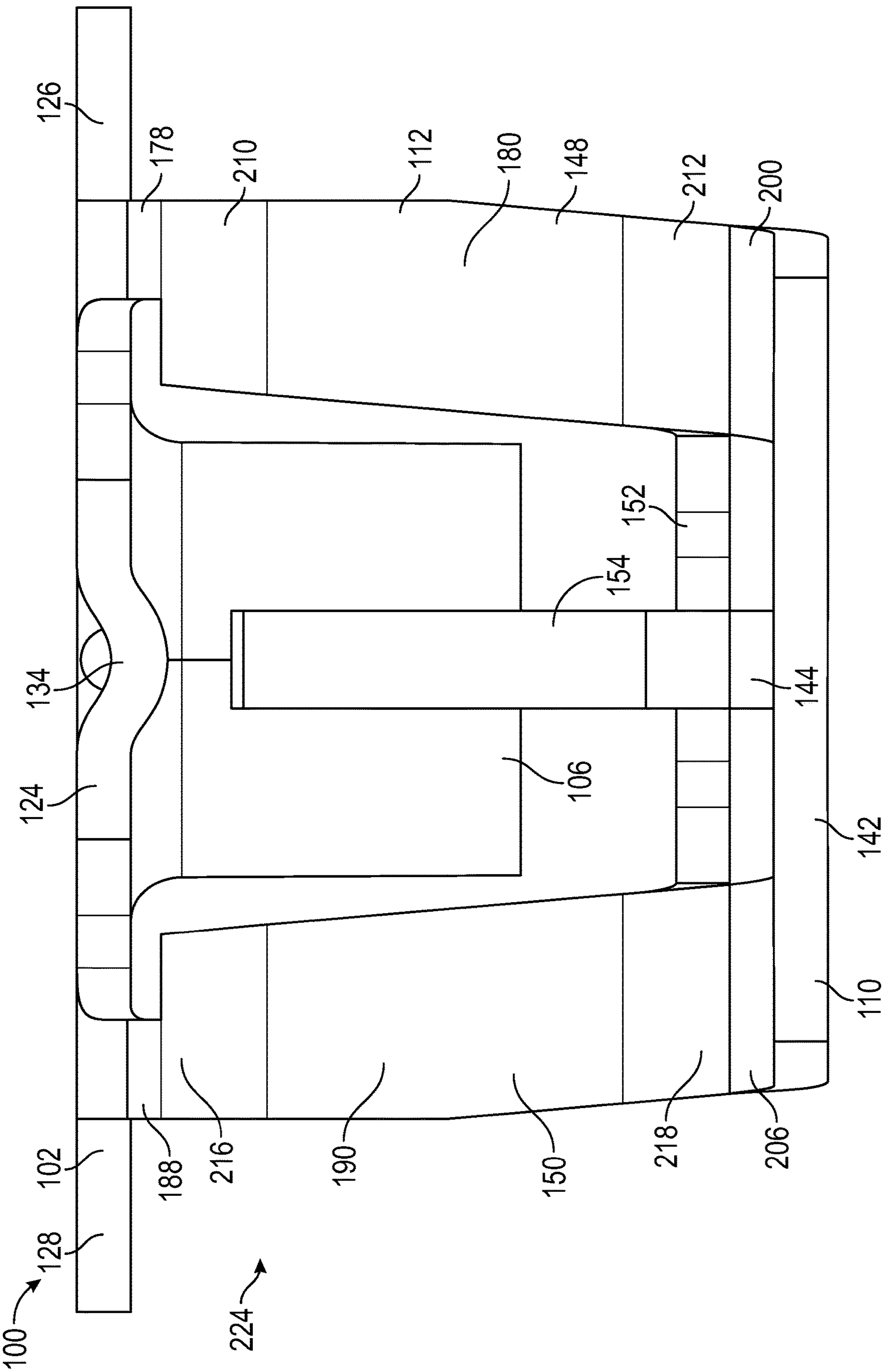
FIG. 5 is a side view of the first example box nut retainer of FIGS. 1-4.
Figure 6:
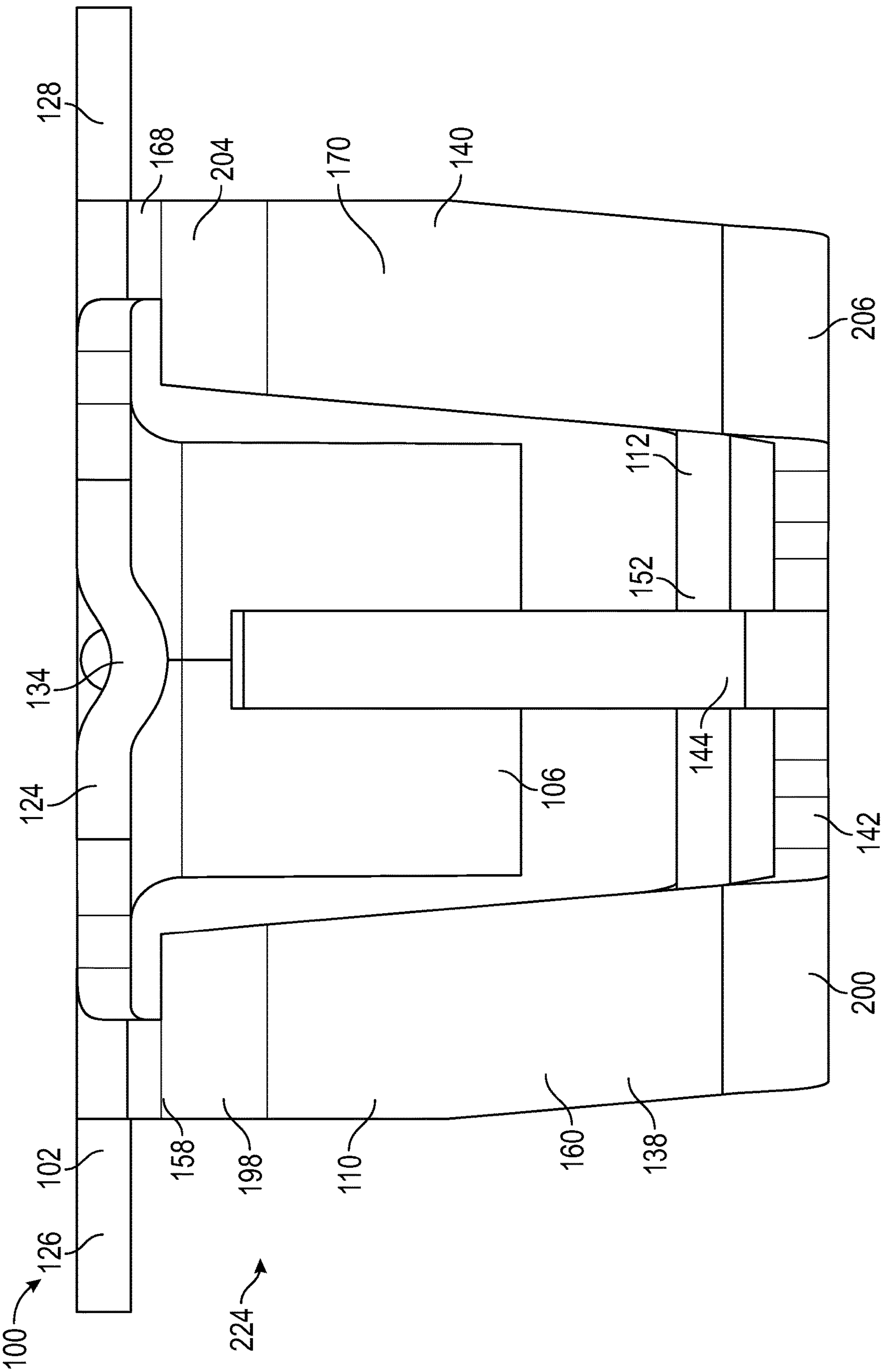
FIG. 6 is another side view of the first example box nut retainer of FIGS. 1-5.

With reference to FIG. 4, the first leg 138 includes a first top extender 158, a first descender 160, and a first bottom extender 162. The first top extender 158 includes a first kink 164. The first kink 164 is arcuate. The first top extender 158 is connected to the support 102 via the third tab 126. The first descender 160 is connected to the first top extender 158 and to the first bottom extender 162. The first top extender 158 extends curvilinearly and downwardly from the third tab 126 between the fastener sleeve 106 and the first tab 122.

Figure 3:
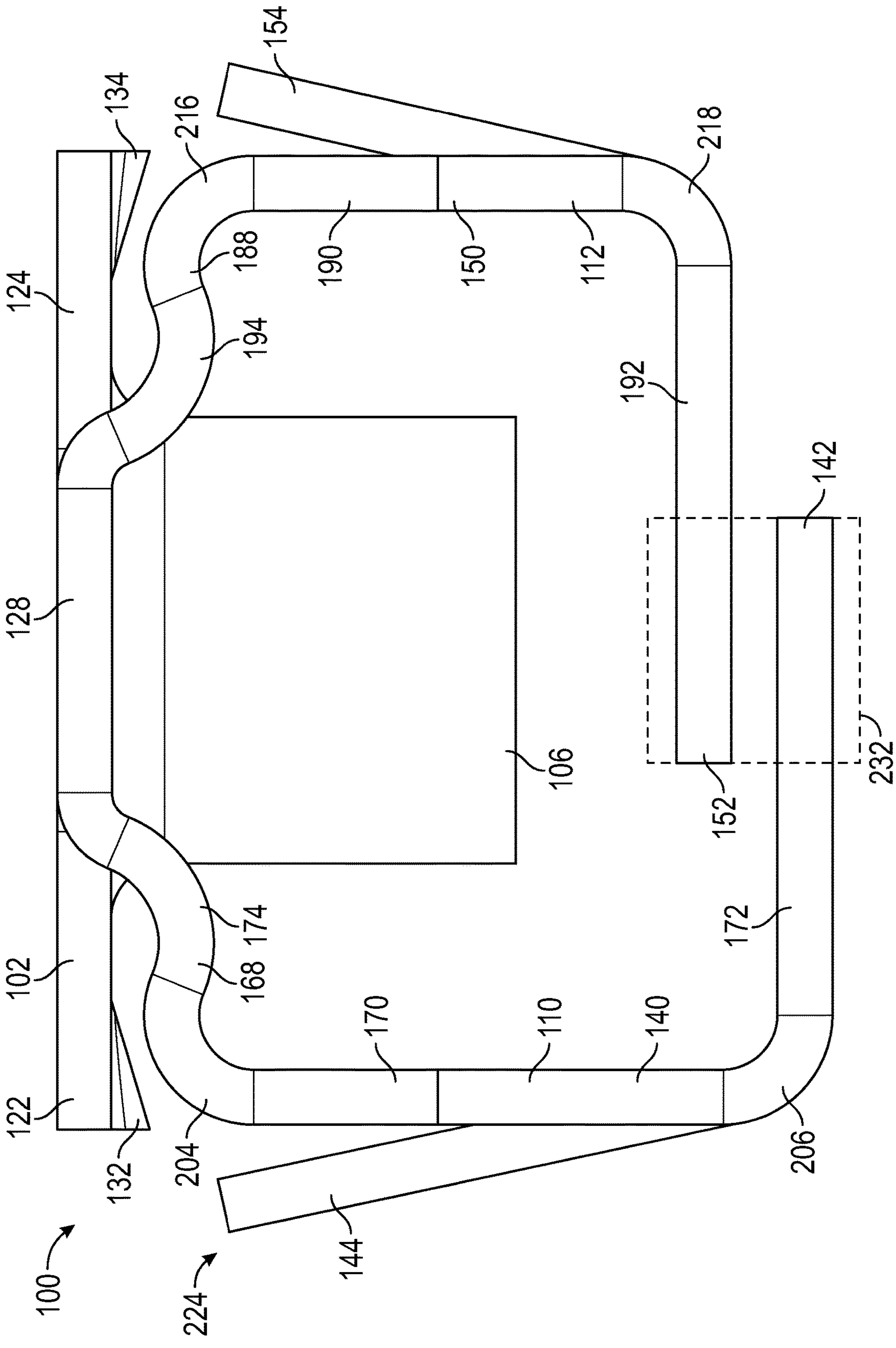
FIG. 3 is an end view of the first example box nut retainer of FIGS. 1 and 2.
Figure 8:
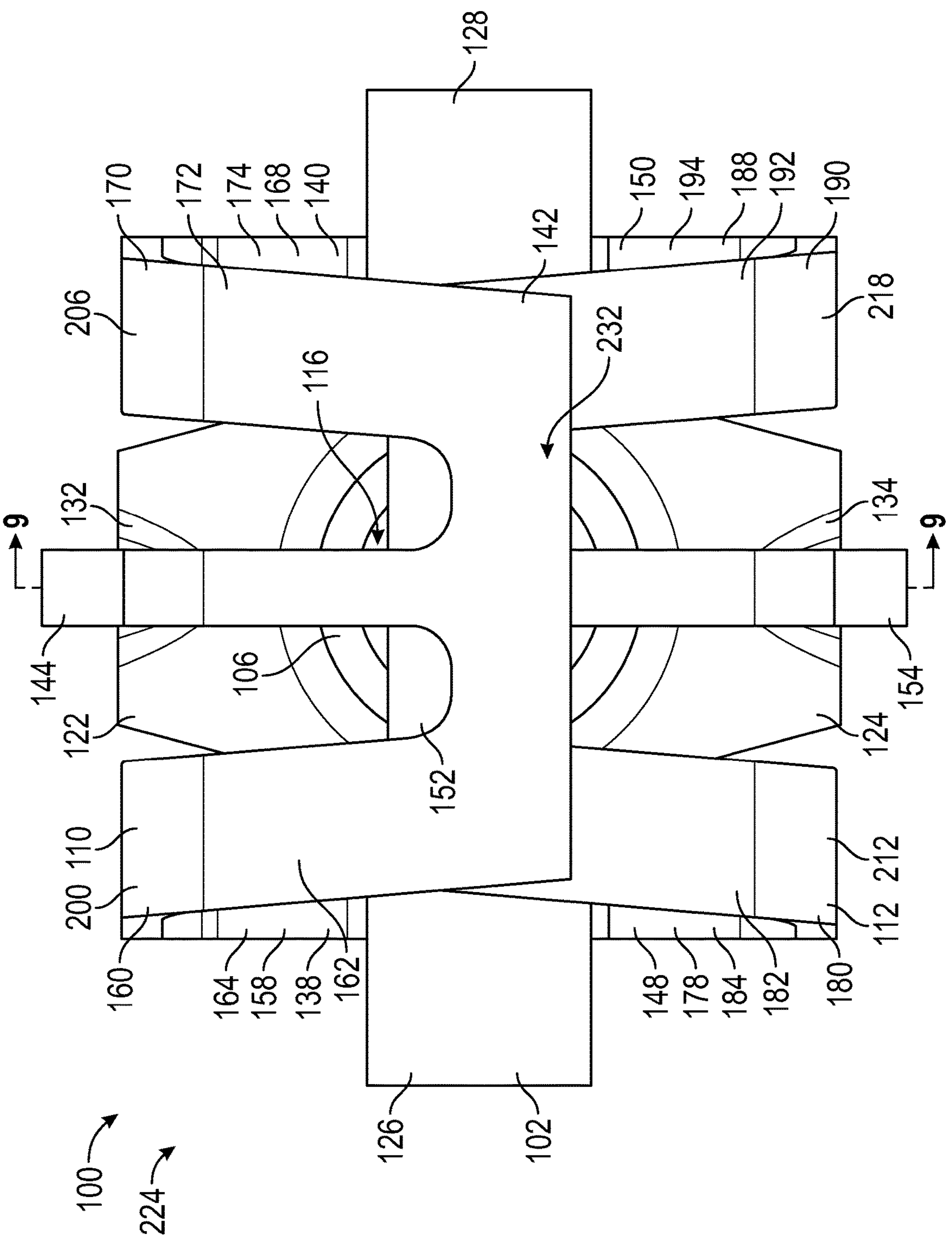
FIG. 8 is a bottom view of the first example box nut retainer of FIGS. 1-7.
Figure 9:
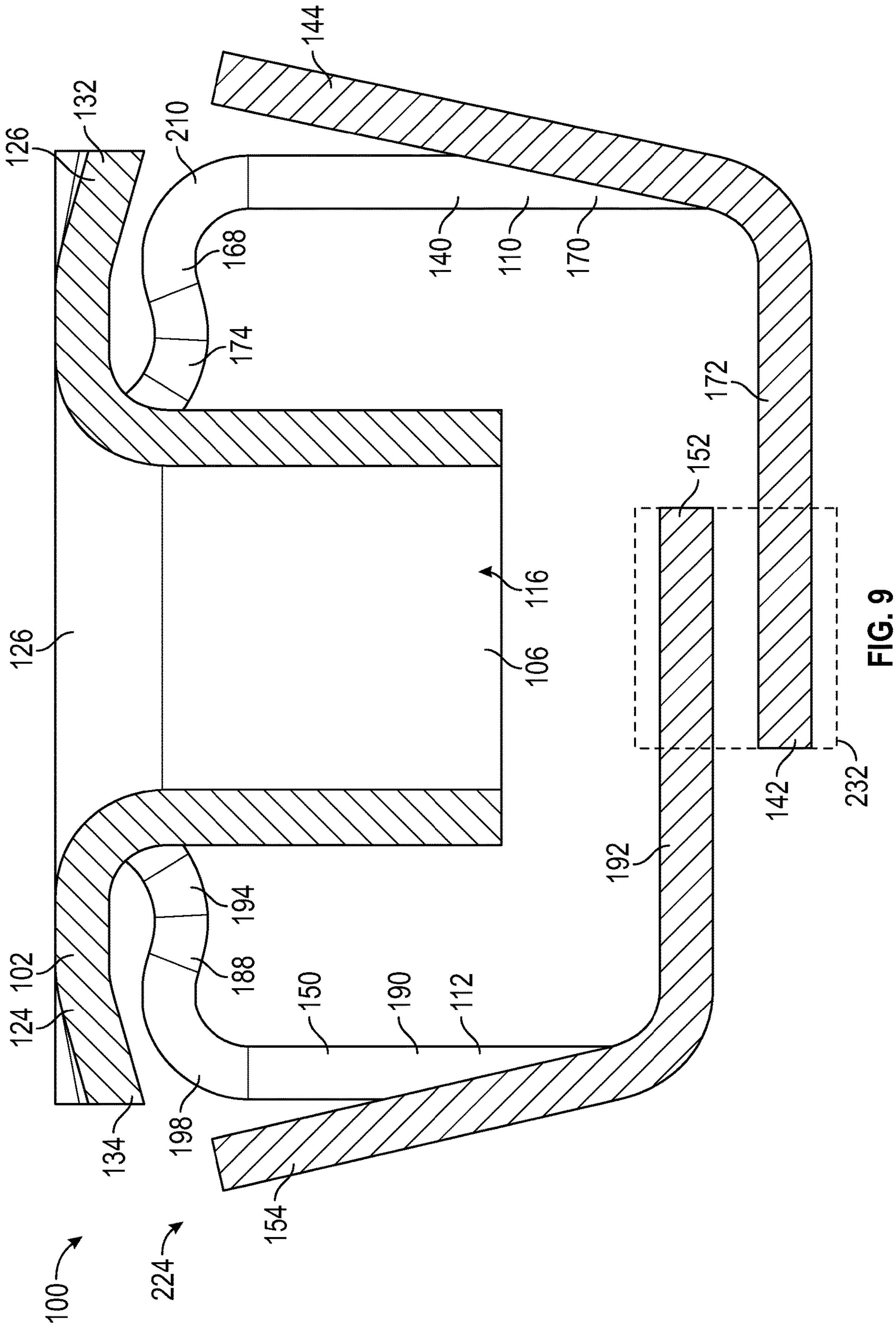
FIG. 9 is a cross-sectional view of the first example box nut retainer of FIGS. 1-8 taken along line 9-9 of FIG. 8.

With reference to FIG. 3, the second leg 140 includes a second top extender 168, a second descender 170, and a second bottom extender 172. The second top extender includes a second kink 174. The second kink 174 is arcuate. The second top extender 168 is connected to the support 102 via the fourth tab 128. The second descender 170 is connected to the second top extender 168 and the second bottom extender 172. The second top extender 168 extends curvilinearly and downwardly from the fourth tab 128 between the fastener sleeve 106 and the first tab 122. With reference to FIG. 8, the first bottom extender 162 is connected to the second bottom extender 172 via the first connector 142.

With reference to FIG. 4, the third leg 148 includes a third top extender 178, a third descender 180, and a third bottom extender 182. The third top extender 178 includes a third kink 184. The third kink 184 is arcuate. The third top extender 178 is connected to the support 102 via the third tab 126 opposite the first top extender 158. The third descender 180 is connected to the third top extender 178 and to the third bottom extender 182. The third top extender 178 extends curvilinearly and downwardly from the third tab 126 between the fastener sleeve 106 and the second tab 124.

With reference to FIG. 3, the fourth leg 150 includes a fourth top extender 188, a fourth descender 190, and a fourth bottom extender 192. The fourth top extender includes a fourth kink 194. The fourth kink 194 is arcuate. The fourth top extender 188 is connected to the support 102 via the fourth tab 128 opposite the second top extender 168. The fourth descender 190 is connected to the fourth top extender 188 and the fourth bottom extender 192. The fourth top extender 188 extends curvilinearly and downwardly from the fourth tab 128 between the fastener sleeve 106 and the second tab 124. With reference to FIG. 8, the third bottom extender 182 is connected to the fourth bottom extender 192 via the second connector 152.

Figure 7:
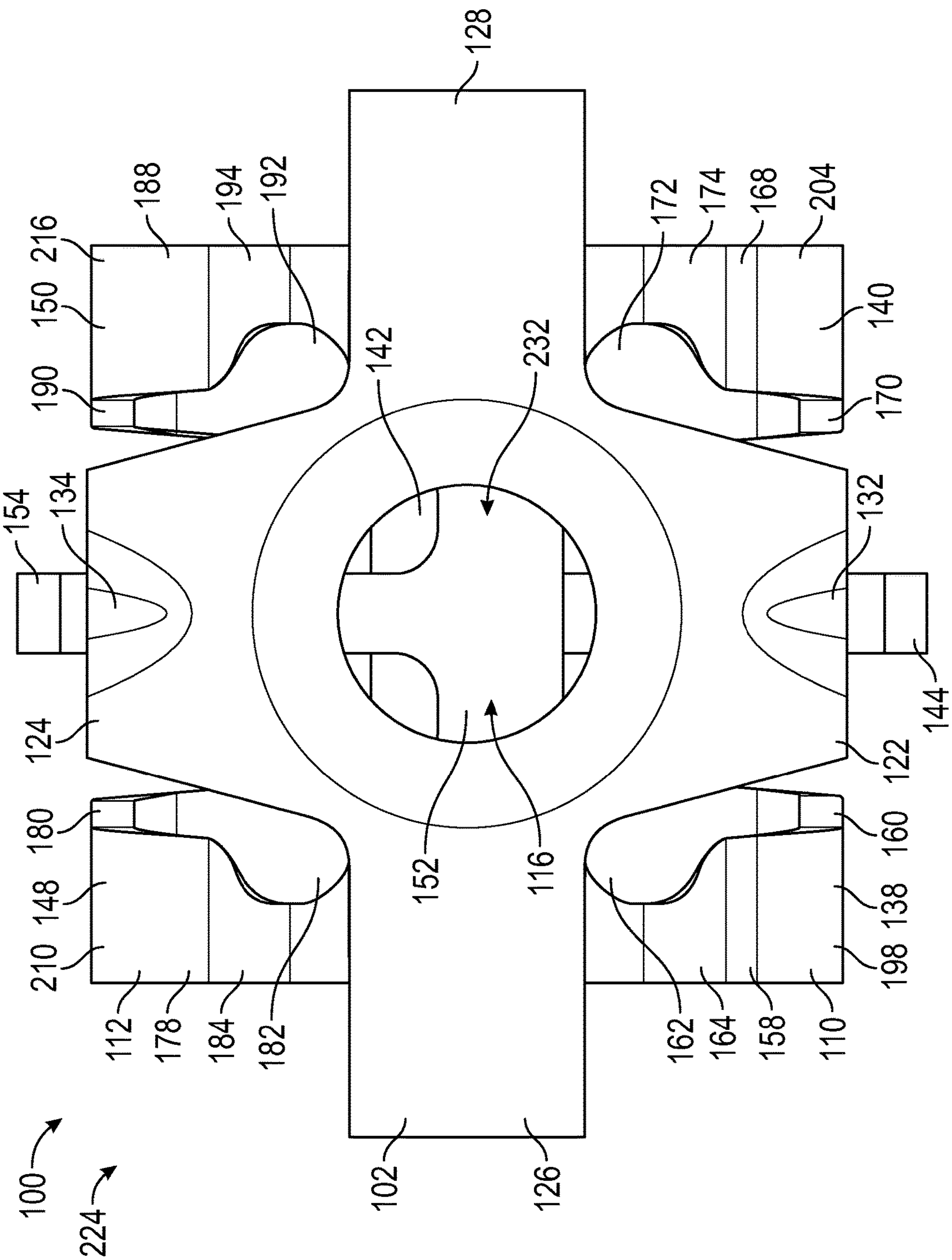
FIG. 7 is a top view of the first example box nut retainer of FIGS. 1-6.

With reference to FIG. 7, the first top extender 158 and the second top extender 168 are generally parallel to one another. The third top extender 178 and the fourth top extender 188 are generally parallel to one another.

With reference to FIG. 4, the first descender 160 and the first top extender 158 define a first top corner 198. Additionally, the first descender 160 and the first bottom extender 162 define a first bottom corner 200.

With reference to FIG. 3, the second descender 170 and the second top extender 168 define a second top corner 204. Additionally, the second descender 170 and the second bottom extender 172 define a second bottom corner 206.

With reference to FIG. 4, the third descender 180 and the third top extender 178 define a third top corner 210. Additionally, the third descender 180 and the third bottom extender 182 define a third bottom corner 212.

With reference to FIG. 3, the fourth descender 190 and the fourth top extender 188 define a fourth top corner 216. Additionally, the fourth descender 190 and the fourth bottom extender 192 define a fourth bottom corner 218.

Figure 14:
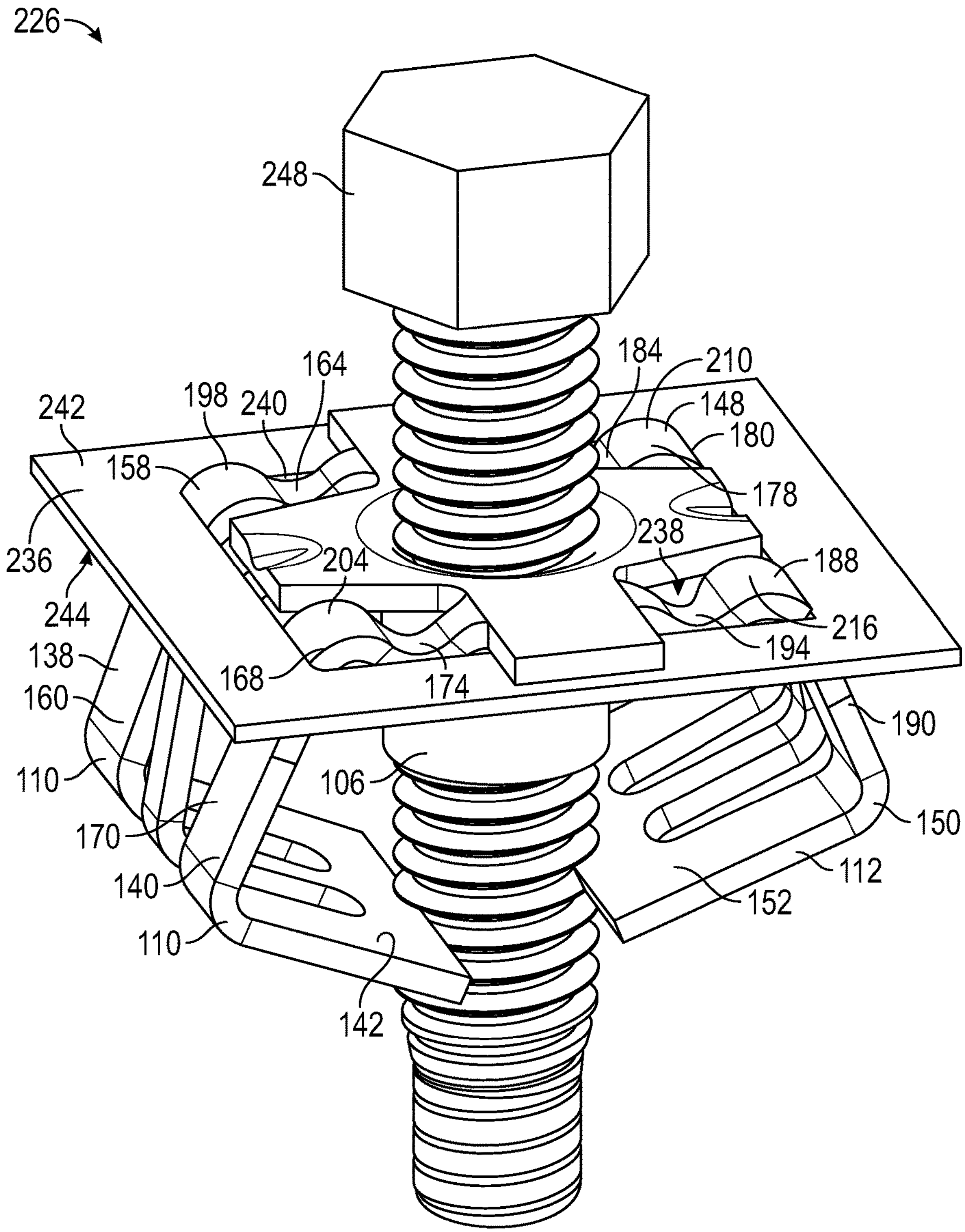
FIG. 14 is a side view of a first example assembly including the first example box nut retainer of FIGS. 1-13 installed in the panel of FIGS. 10-13 and utilized with a fastener.
Figure 15:
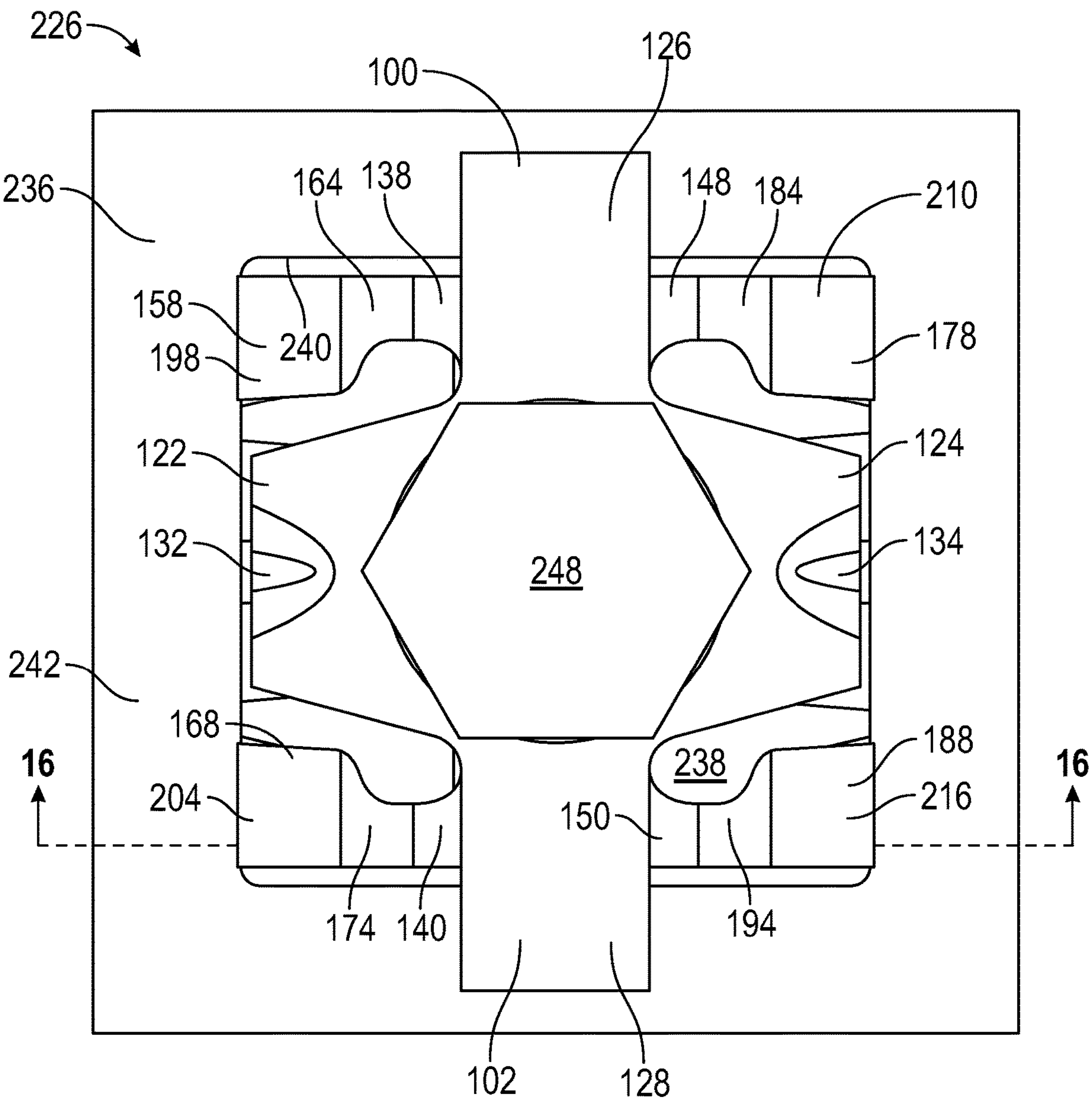
FIG. 15 is a bottom view of the first example assembly of FIG. 14.
Figure 16:
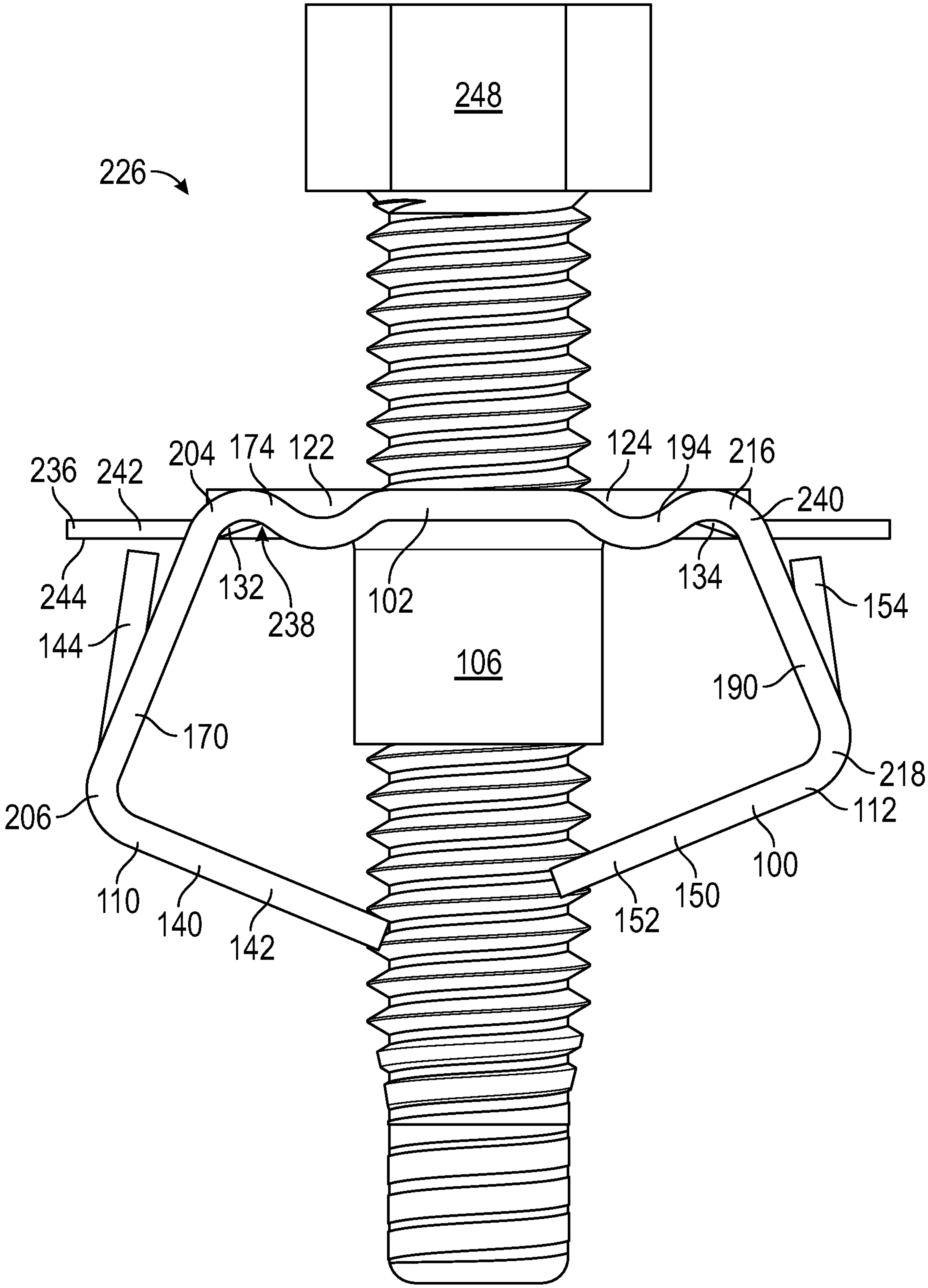
FIG. 16 is a cross-sectional view of the first example assembly of FIGS. 13 and 14 taken along line 16-16 of FIG. 15.

With reference to FIGS. 1-13, the box nut retainer 100 is shown in a relaxed state 224. With reference to FIGS. 14-16, the box nut retainer 100 is shown is a deployed state 226. With reference to FIGS. 1-4 and 7-13, when the box nut retainer 100 is in the relaxed state 224, the first wing 110 and the second wing 112 overlap one another at an overlap region 232. With reference to FIGS. 1, 2, and 7-13, the overlap region 232 at least partially overshadows the opening 116. With reference to FIG. 3, when the box nut retainer 100 is in the relaxed state 224, the second top corner 204 is below the support 102 between the fastener sleeve 106 and the first tab 122. When the box nut retainer 100 is in the relaxed state 224, the fourth top corner 216 is below the support 102 between the fastener sleeve 106 and the second tab 124. With reference to FIG. 4, when the box nut retainer 100 is in the relaxed state 224, the first top corner 198 is below the support 102 between the fastener sleeve 106 and the first tab 122. When the box nut retainer 100 is in the relaxed state 224, the third top corner 210 is below the support 102 between the fastener sleeve 106 and the second tab 124.

Figure 11:
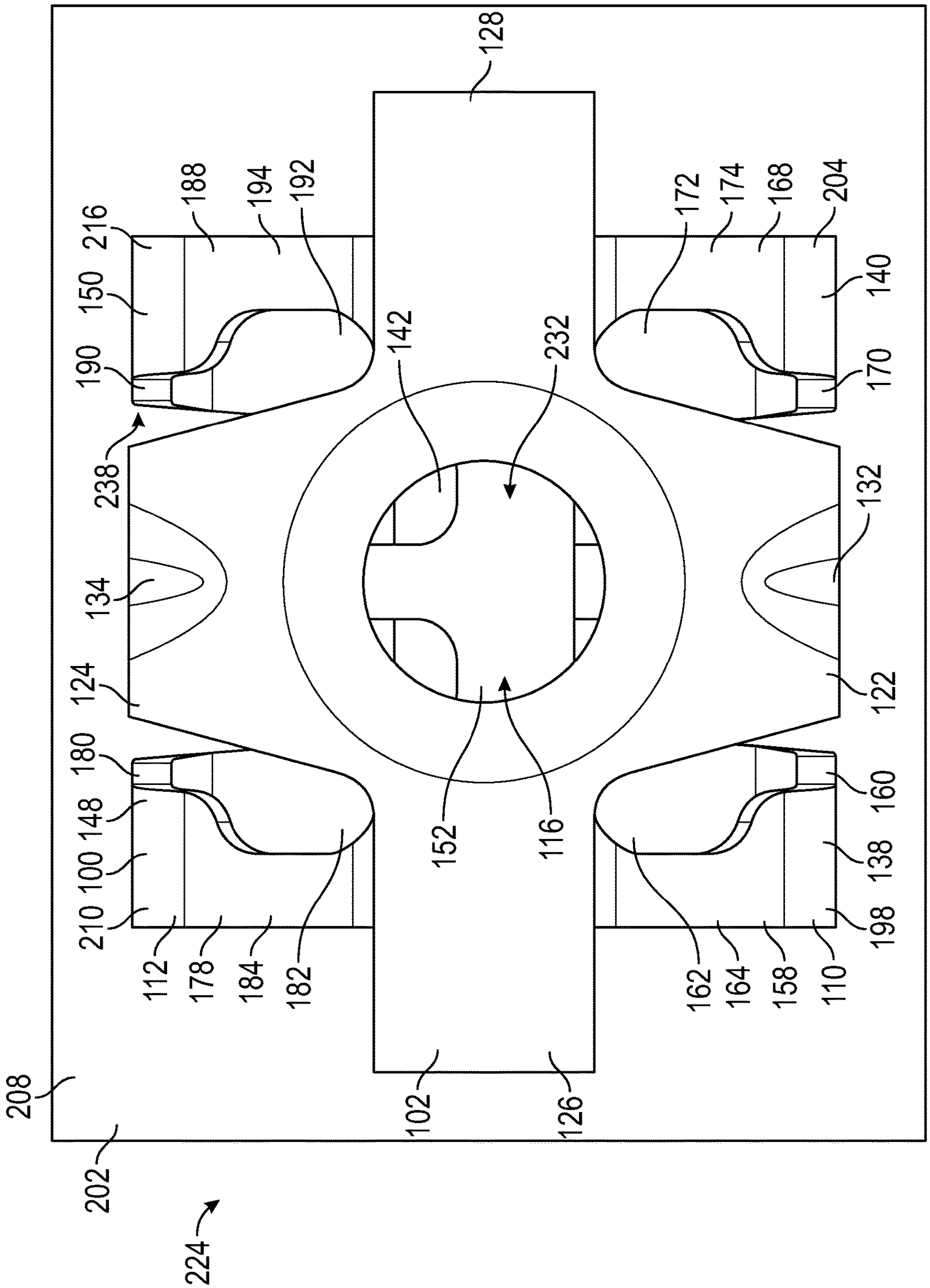
FIG. 11 is a top view of the first example box nut retainer of FIGS. 1-10 installed in the panel of FIG. 10.
Figure 12:
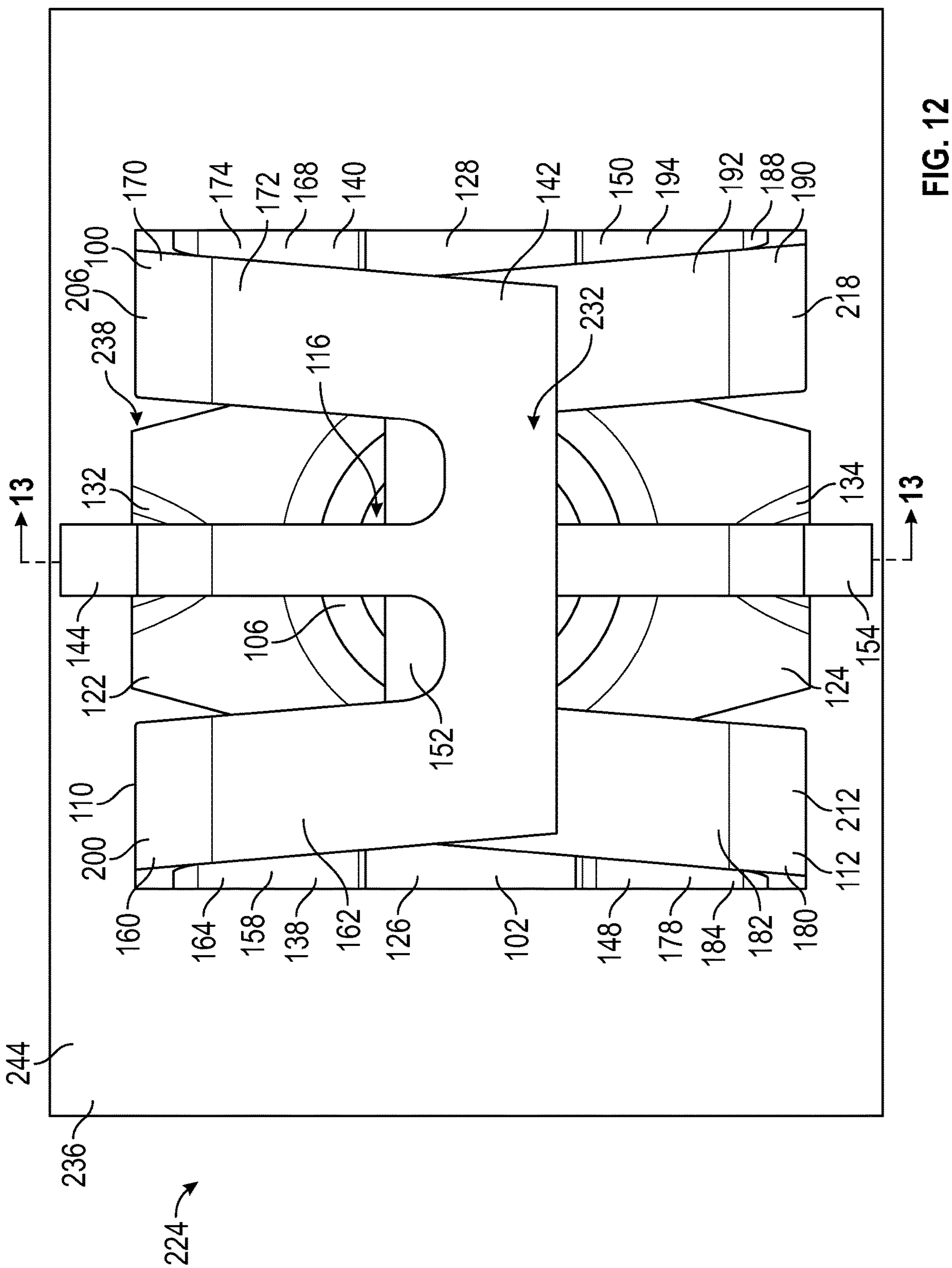
FIG. 12 is a bottom view of the first example box nut retainer of FIGS. 1-11 installed in the panel of FIGS. 10 and 11.
Figure 13:
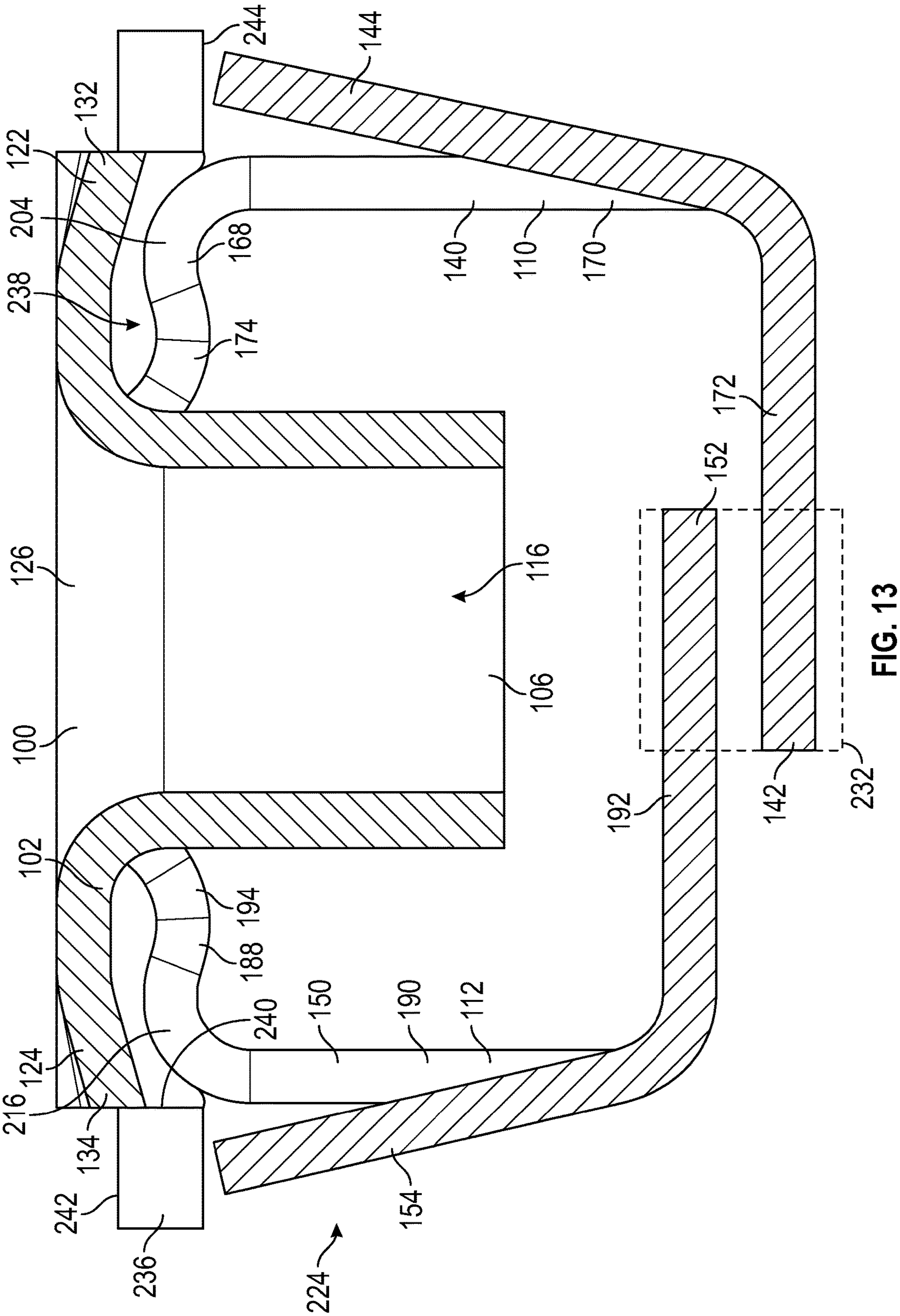
FIG. 13 is a cross-sectional view of the first example box nut retainer of FIGS. 1-12 installed in the panel of FIGS. 10-12 taken along line 13-13 of FIG. 12.

With reference to FIGS. 10-13, the first example box nut retainer 100 is installed in a panel 236. The panel 236 defines an aperture 238. With reference to FIGS. 10, 11, and 13, the panel 236 includes walls 240 and a top surface 242. With reference to FIGS. 12 and 13, the panel 236 includes a bottom surface 244. With reference to FIGS. 10-13, more specifically, the walls 240 define the aperture 238. With reference to FIGS. 10-12, the aperture 238 is noncircular (e.g., rectangular, square, polygonal, ovate, etc.).

With reference to FIGS. 14-17, the first example box nut retainer 100 is installed in the panel 236 and engaged with a fastener 248 (e.g., a screw or a bolt). The fastener 248 is externally threaded. The fastener sleeve 106 is configured to receive the fastener 248. In some embodiments, the fastener sleeve 106 is internally threaded to guide and/or align the fastener 248 to traverse through the fastener sleeve 106.

With reference to FIGS. 14-17, additionally or alternatively, the fastener sleeve 106 may be configured to accept a specific type of fastener. As but one non-limiting example, the fastener sleeve 106 may be configured to accept M series fasteners. The fastener sleeve 106 may be configured to have an inner diameter compatible with a specific M series fastener. Optionally, the M series screws and/or bolts are based on the International Organization for Standardization (ISO) 965, "ISO General Purpose Metric Screw Thread—Tolerances," the American National Standards Institute B4.2-1978, "Preferred Metric Limits and Fits," the American National Standards Institute B1.13M, "Metric Screw Threads: M Profile," and/or the like. In other examples, the fastener sleeve 106 may be configured to accept non-threaded fasteners (e.g., rivets, barbed push-in fasteners, rods, dowels, etc.).

With reference to FIGS. 10 and 11, in operation, when the first example box nut retainer 100 is installed into the panel 236, the support 102, the first wing 110, and the second wing 112 engage the panel 236. The box nut retainer 100 is introduced into the aperture 238 via the first wing 110 and the second wing 112.

With reference to FIG. 13, it should be understood that, in operation, the first snap arm 144 and the second snap arm 154 deflect inwardly toward the fastener sleeve 106 as the first wing 110 and the second wing 112 are inserted into the aperture 238. Once the first snap arm 144 and the second snap arm 154 clear the bottom surface 244, the first snap arm 144 and the second snap arm 154 resiliently snap outwardly away from fastener sleeve 106. Thus, the first snap arm 144 and the second snap arm 154 prevent the box nut retainer 100 from being pulled out of the aperture 238 of the panel 236. With reference to FIGS. 10 and 11, the third tab 126 and the fourth tab 128 engage the top surface 242 to prevent the box nut retainer 100 from being pushed completely through the aperture 238 of the panel 236. With reference to FIG. 10, in other words, the third tab 126, the fourth tab 128, the first snap arm 144, and the second snap arm 154 transversely retain the box nut retainer 100 in the aperture 238 of the panel 236. It should be understood that when the box nut retainer 100 is installed in the panel 236 and in the relaxed state 224, the third tab 126, the fourth tab 128, the first snap arm 144, and the second snap arm 154 loosely retain the box nut retainer 100 in the aperture 238 of the panel 236.

With reference to FIGS. 10-12, the first wing 110, the second wing 112, the first tab 122, and the second tab 124 engage the walls 240 of the panel 236. More specifically, with reference to FIGS. 10 and 13, when the box nut retainer 100 is installed in the panel 236, the first retaining dip 132 and the second retaining dip 134 are partially disposed between the top surface 242 and the bottom surface 244 to abuttingly engage the walls 240. Further, the second top extender 168 and the fourth top extender 188 are partially disposed between the top surface 242 and the bottom surface 244 to abuttingly engage the walls 240. Additionally, with reference to FIG. 10, the first top extender 158 and the third top extender 178 are partially disposed between the top surface 242 and the bottom surface 244 to abuttingly engage the walls 240. Thus, the first retaining dip 132, the second retaining dip 134, the first top extender 158, the second top extender 168, the third top extender 178, and the fourth top extender 188 prevent the box nut retainer 100 from sliding relative to the panel 236. In other words, the support 102, the first wing 110, and the second wing 112 laterally retain the box nut retainer 100 in the aperture 238 of the panel 236.

With reference to FIG. 13, when the box nut retainer 100 is installed in the panel 236 and in the relaxed state 224, the second top corner 204, the second kink 174, the fourth top corner 216, and the fourth kink 194 are between the top surface 242 and the bottom surface 244. Additionally, with reference to FIG. 10, when the box nut retainer 100 is installed in the panel 236 and in the relaxed state 224, the first top corner 198, the first kink 164, the third top corner 210, and the third kink 184 are between the top surface 242 and the bottom surface 244.

With reference to FIG. 14, further in operation, as the fastener 248 is threaded into the fastener sleeve 106, the fastener 248 initially contacts the second wing 112 and subsequently contacts the first wing 110. As the fastener 248 is threadingly driven against the first wing 110 and the second wing 112, the first wing 110 and the second wing 112 pivot relative to the support 102 to deflect outwardly away from the fastener sleeve 106 into the deployed state 226. More specifically, the first leg 138, the second leg 140, the third leg 148, and the fourth leg 150 respectively bend at the first kink 164, the second kink 174, the third kink 184, and the fourth kink 194. When the box nut retainer 100 is in the deployed state 226, the first top corner 198, the second top corner 204, the third top corner 210, and the fourth top corner 216 are pushed out of the aperture 238 beyond the top surface 242 and the support 102. Thus, with reference to FIGS. 14 and 16, when the box nut retainer 100 is in the deployed state 226, the second descender 170 and the fourth descender 190 contact the walls 240 and the bottom surface 244. With reference to FIG. 14, the first descender 160 and the third descender 180 also contact the walls 240 and the bottom surface 244. In other words, as the first wing 110 and the second wing 112 deploy under pressure applied by the fastener 248, the first descender 160, the second descender 170, the third descender 180, and the fourth descender 190 are driven against the walls 240 and the bottom surface 244 to draw the third tab 126 and the fourth tab 128 against the top surface 242. Thus, when the box nut retainer 100 is installed in the panel 236 and in the deployed state 226, the third tab 126, the fourth tab 128, the first wing 110, and the second wing 112 tightly retain the box nut retainer 100 in the aperture 238 of the panel 236. In other words, when the box nut retainer 100 is installed in the panel 236 and in the deployed state 226, the panel 236 is clamped between the support 102 and the first wing 110 and between the support 102 and the second wing 112.

With reference to FIGS. 14-16, it should be understood that additional components (e.g., a second panel, a wiring harness, a brake line router, etc.) (not shown) may be used with the fastener 248. The fastener 248 may be driven into the box nut retainer 100 to robustly attach the additional components to the panel 236.

A second example box nut retainer 300 according to an embodiment of the present disclosure is depicted in FIGS. 17-31. With reference to FIGS. 17-22, 24, 25, 27-29, and 31 the box nut retainer 300 includes the support 102 and the fastener sleeve 106 as described above. The box nut retainer 300 also includes a first wing 310 and a second wing 312.

Figure 17:
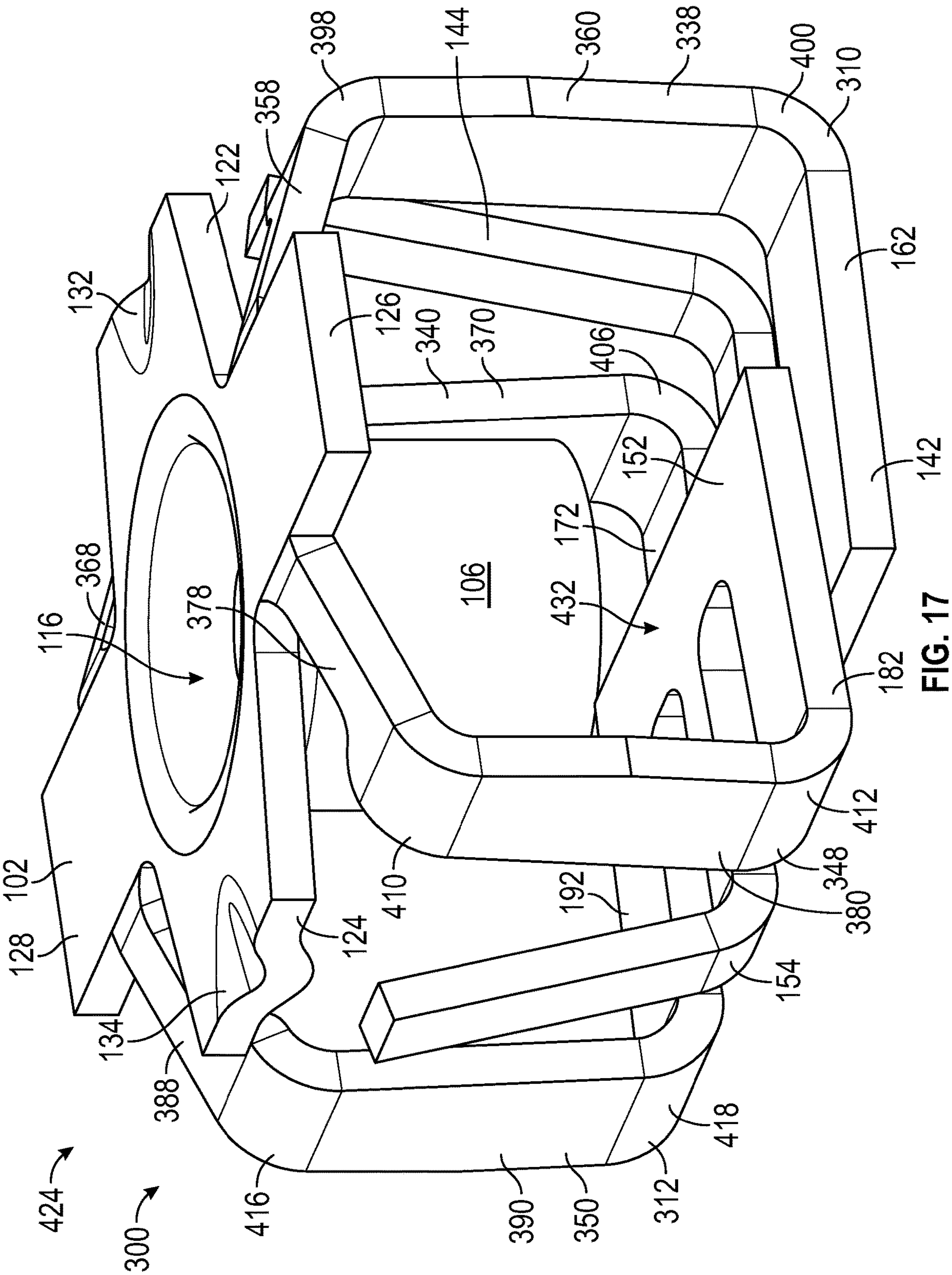
FIG. 17 is an isometric view of a second example box nut retainer according to an embodiment of the present disclosure.
Figure 18:
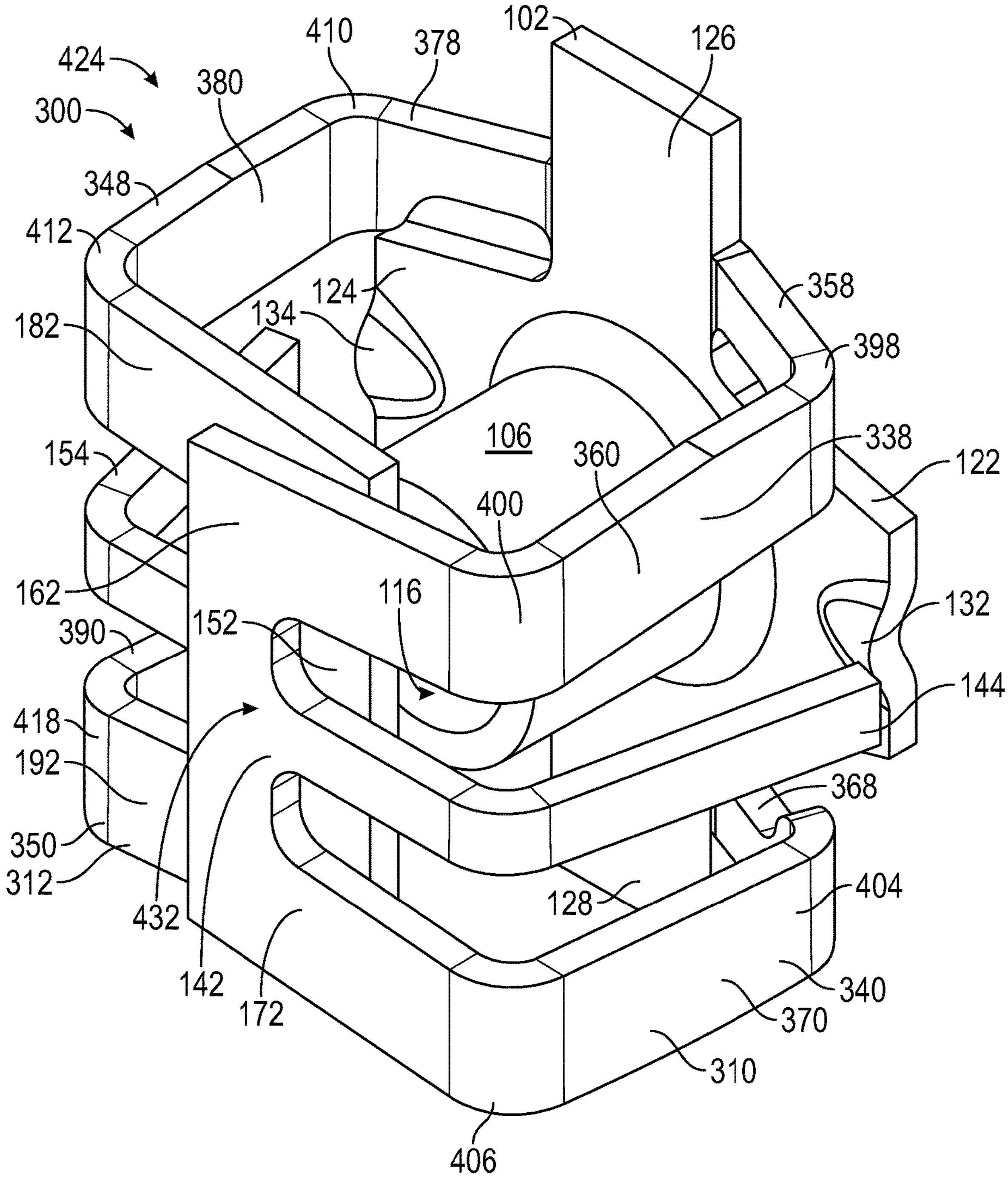
FIG. 18 is another isometric view of the second example box nut retainer of FIG. 17.

With reference to FIGS. 17 and 18, the first wing 310 includes a first leg 338, a second leg 340, the first connector 142, and the first snap arm 144. The first connector 142 is connected to the first leg 338 and the second leg 340. The first snap arm 144 extends from the first connector 142 between the first leg 338 and the second leg 340. The first leg 338 and the second leg 340 are C-shaped. The first snap arm 144 is L-shaped. The first snap arm 144 extends outwardly and diagonally beyond the first leg 338 and the second leg 340 toward the support 102. The first snap arm 144 extends beyond the support 102.

With reference to FIGS. 17 and 18, the second wing 312 includes a third leg 348, a fourth leg 350, the second connector 152, and the second snap arm 154. The second connector 152 is connected to the third leg 348 and the fourth leg 350. The second snap arm 154 extends from the second connector 152 between the third leg 348 and the fourth leg 350. The third leg 348 and the fourth leg 350 are C-shaped. The second snap arm 154 is L-shaped. The second snap arm 154 extends outwardly and diagonally beyond the third leg 348 and the fourth leg 350 toward the support 102. The second snap arm 154 extends beyond the support 102. The first snap arm 144 and the second snap arm 154 extend oppositely from one another.

With reference to FIGS. 17 and 18, the first wing 310 and the second wing 312 are connected to the support 102 opposite one another. More specifically, the first leg 338 and the third leg 348 are connected to the third tab 126 opposite one another. Further, the second leg 340 and the fourth leg 350 are connected to the fourth tab 128 opposite one another.

Figure 20:
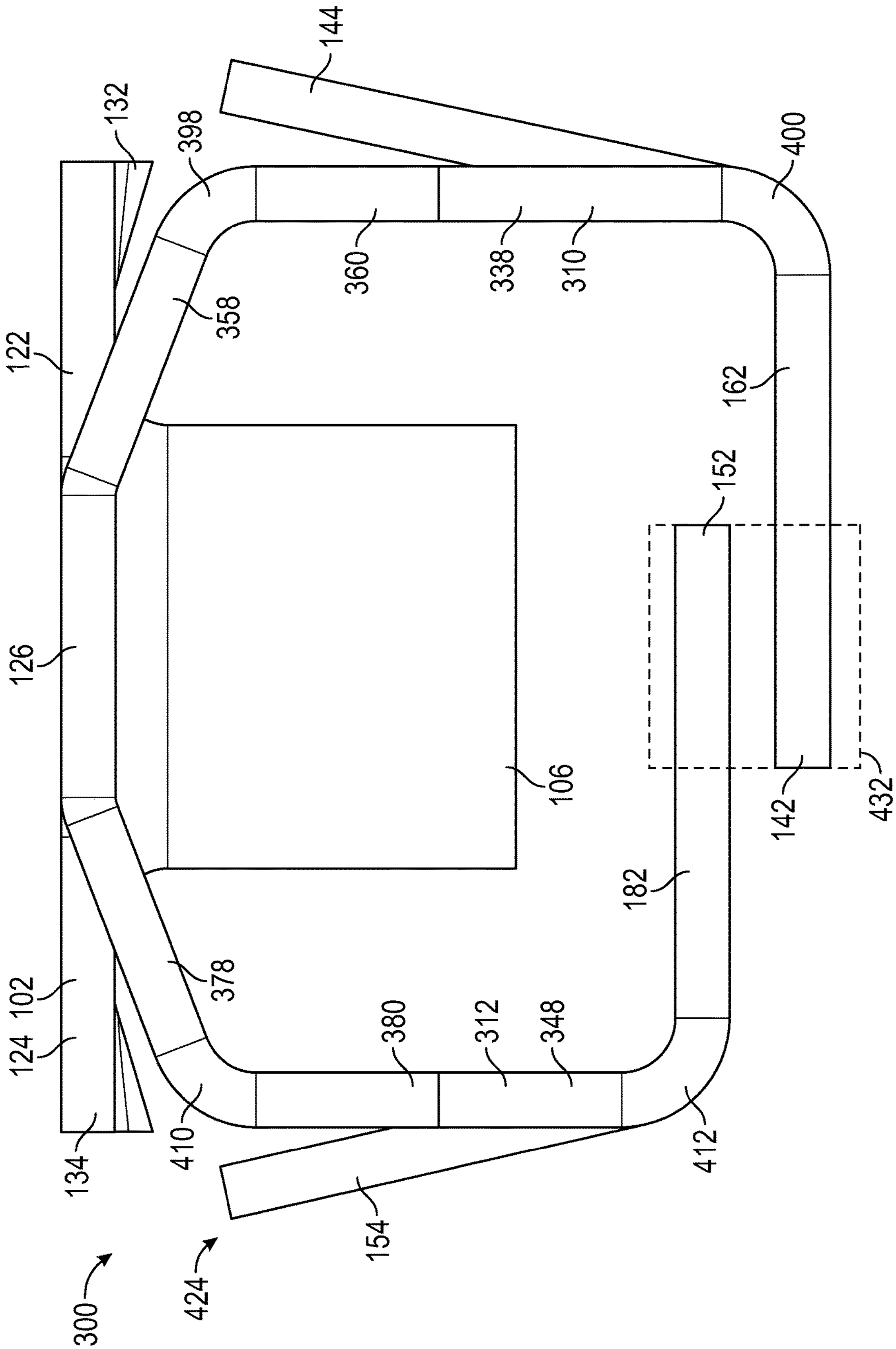
FIG. 20 is another end view of the second example box nut retainer of FIGS. 17-19.
Figure 21:
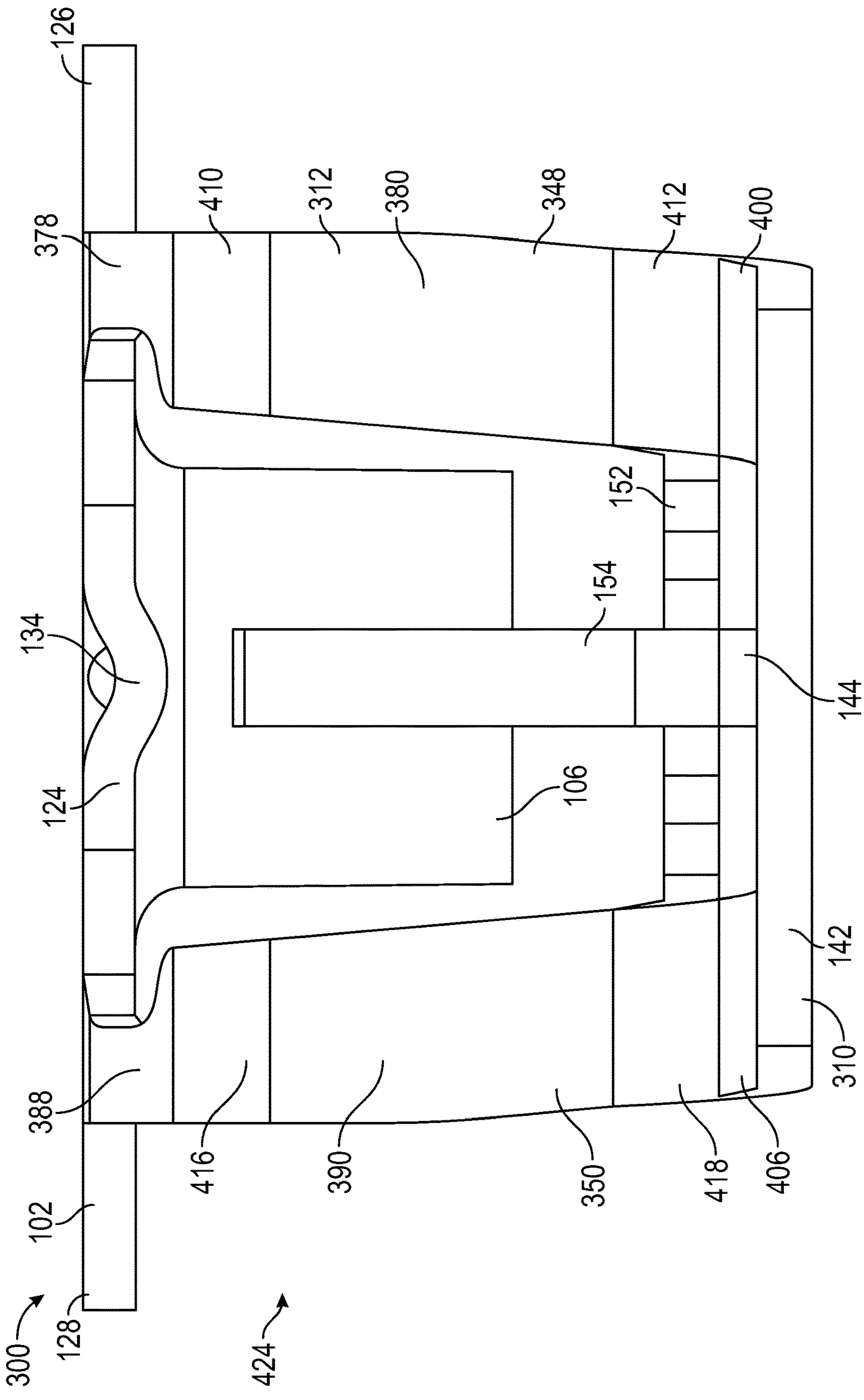
FIG. 21 is a side view of the second example box nut retainer of FIGS. 17-20.
Figure 22:
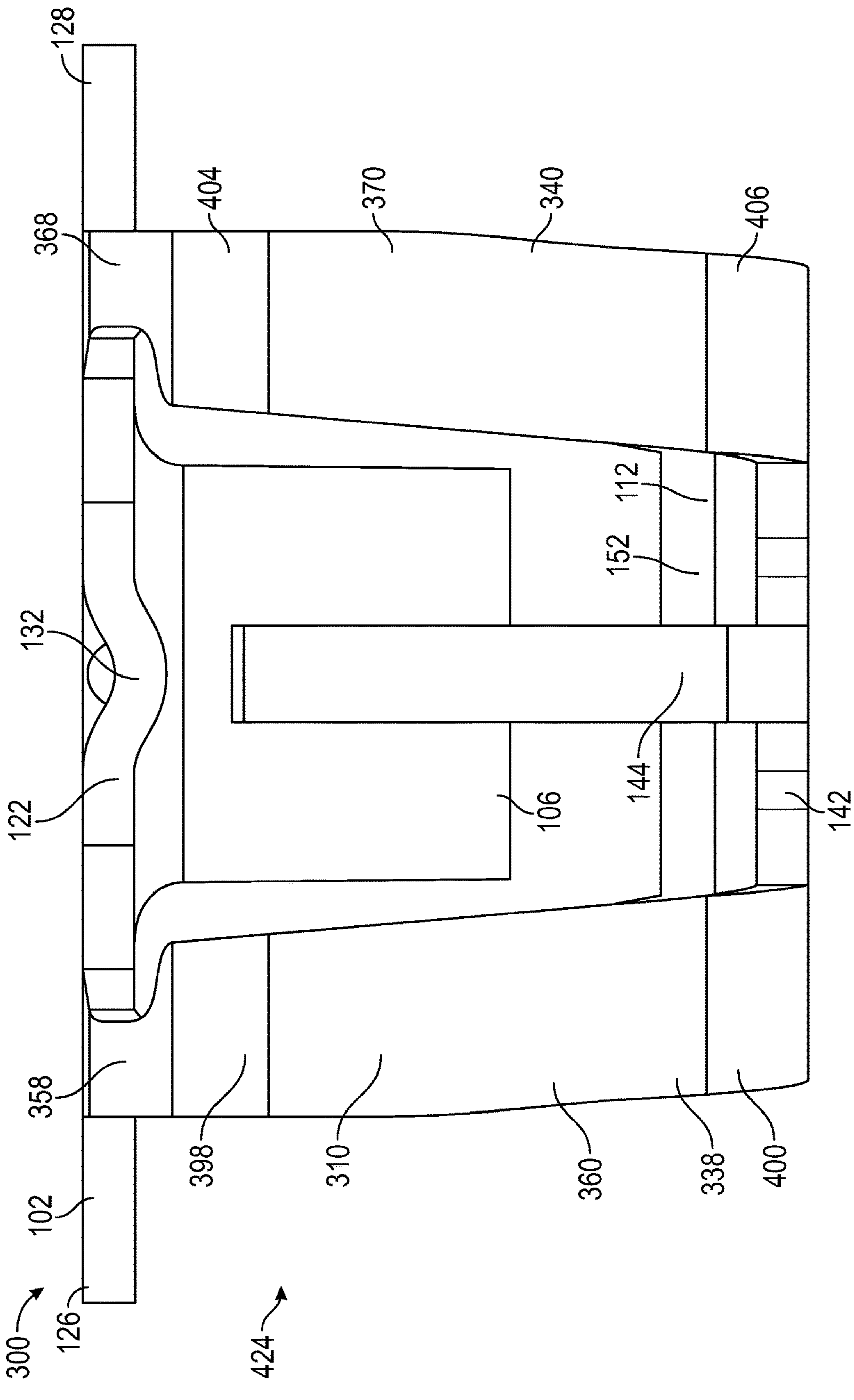
FIG. 22 is another side view of the second example box nut retainer of FIGS. 17-21.

With reference to FIG. 20, the first leg 338 includes a first top extender 358, a first descender 360, and the first bottom extender 162. The first top extender 358 is connected to the support 102 via the third tab 126. The first descender 360 is connected to the first top extender 158 and to the first bottom extender 162. The first top extender 358 extends diagonally and downwardly from the third tab 126 between the fastener sleeve 106 and the first tab 122.

Figure 19:
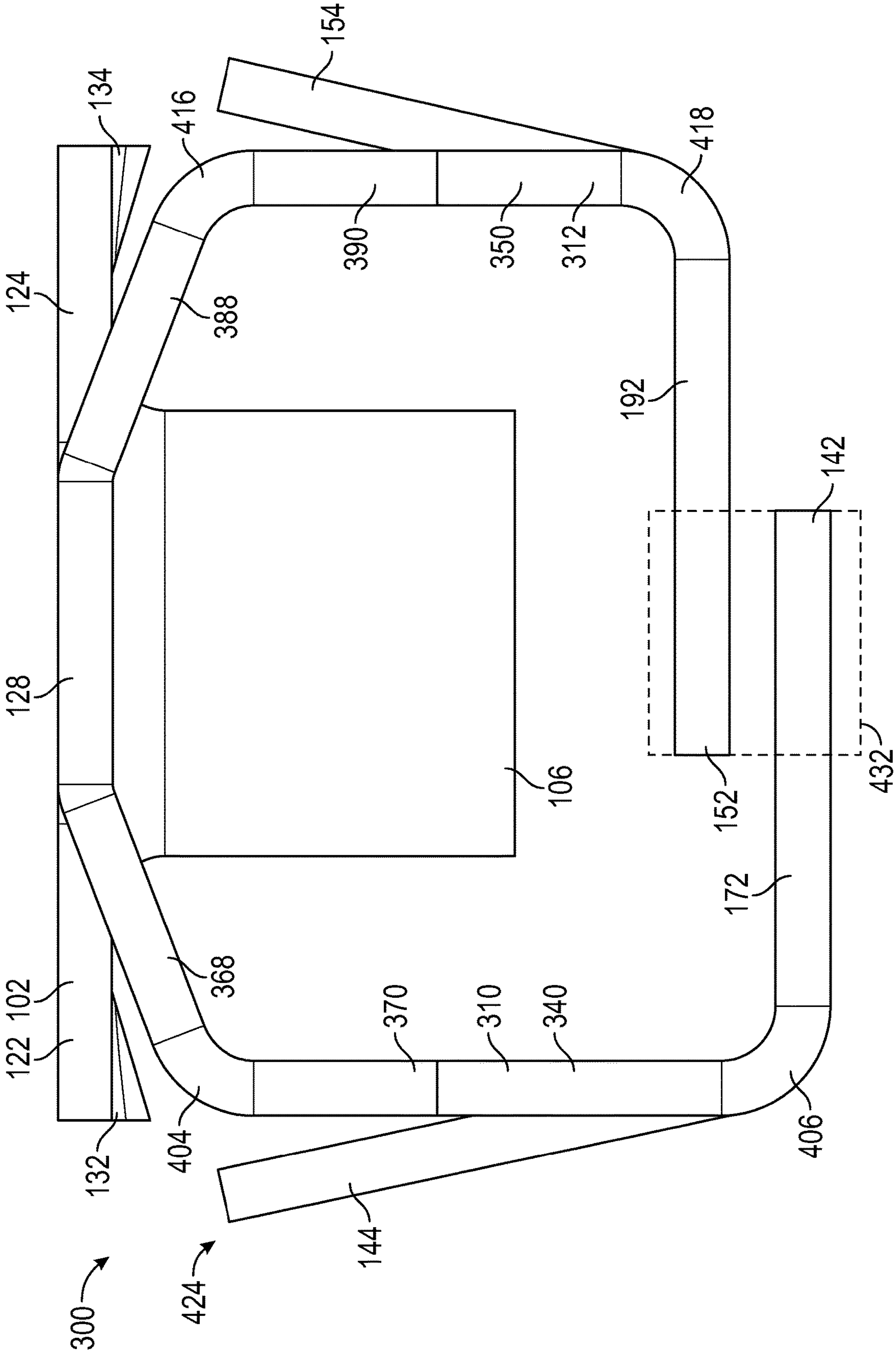
FIG. 19 is an end view of the second example box nut retainer of FIGS. 17 and 18.
Figure 24:
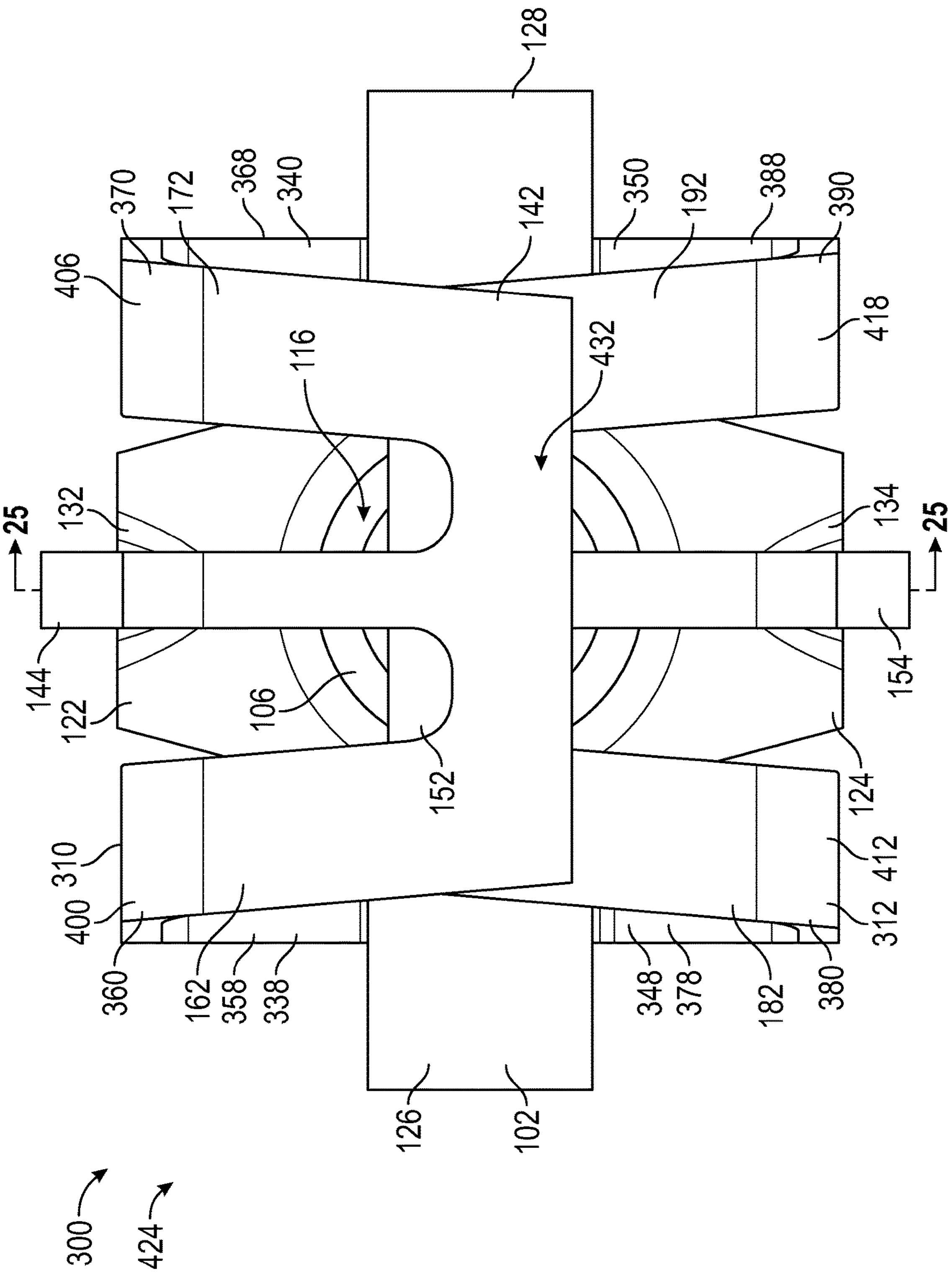
FIG. 24 is a bottom view of the second example box nut retainer of FIGS. 17-23.
Figure 25:
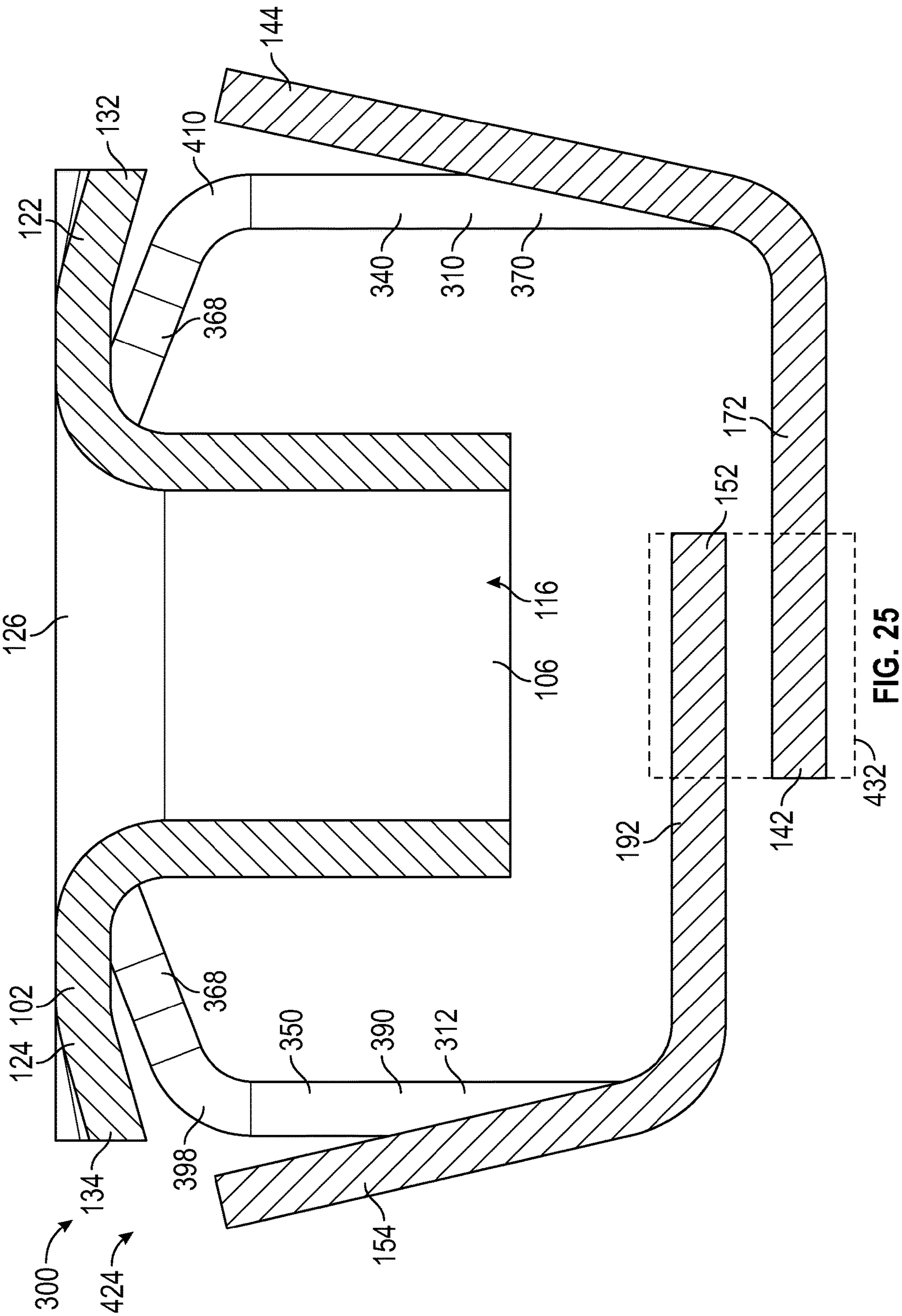
FIG. 25 is a cross-sectional view of the second example box nut retainer of FIGS. 17-24 taken along line 25-25 of FIG. 24.

With reference to FIG. 19, the second leg 340 includes a second top extender 368, a second descender 370, and the second bottom extender 172. The second top extender 368 is connected to the support 102 via the fourth tab 128. The second descender 370 is connected to the second top extender 368 and the second bottom extender 172. The second top extender 368 extends diagonally and downwardly from the fourth tab 128 between the fastener sleeve 106 and the first tab 122. With reference to FIG. 24, the first bottom extender 162 is connected to the second bottom extender 172 via the first connector 142.

With reference to FIG. 20, the third leg 348 includes a third top extender 378, a third descender 380, and the third bottom extender 182. The third top extender 378 is connected to the support 102 via the third tab 126 opposite the first top extender 358. The third descender 180 is connected to the third top extender 378 and to the third bottom extender 182. The third top extender 378 extends diagonally and downwardly from the third tab 126 between the fastener sleeve 106 and the second tab 124.

With reference to FIG. 19, the fourth leg 350 includes a fourth top extender 388, a fourth descender 390, and the fourth bottom extender 192. The fourth top extender 388 is connected to the support 102 via the fourth tab 128 opposite the second top extender 368. The fourth descender 390 is connected to the fourth top extender 388 and the fourth bottom extender 192. The fourth top extender 388 extends diagonally and downwardly from the fourth tab 128 between the fastener sleeve 106 and the second tab 124. With reference to FIG. 24, the third bottom extender 182 is connected to the fourth bottom extender 192 via the second connector 152.

Figure 23:
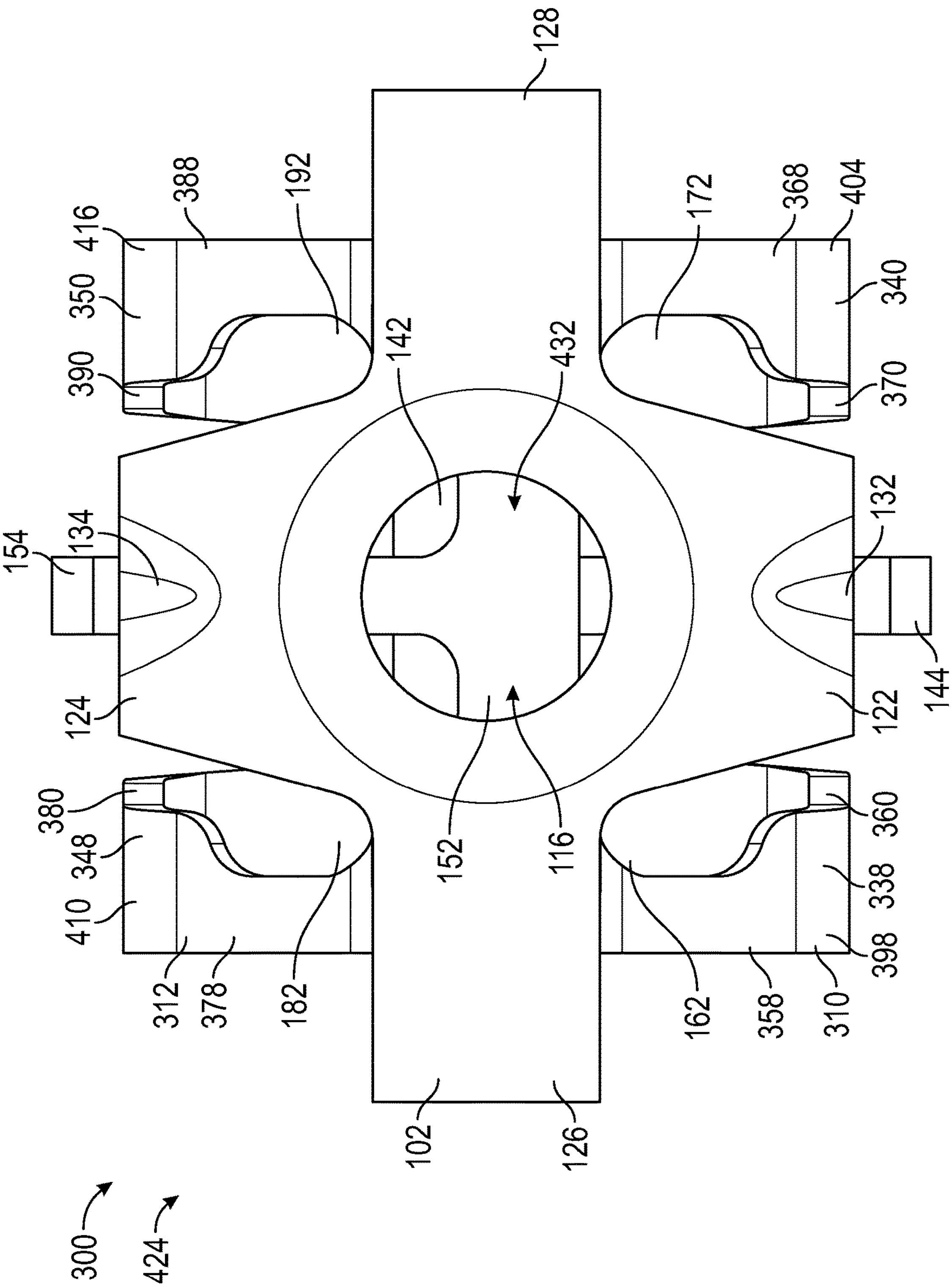
FIG. 23 is a top view of the second example box nut retainer of FIGS. 17-22.

With reference to FIG. 23, the first top extender 358 and the second top extender 368 are generally parallel to one another. The third top extender 378 and the fourth top extender 388 are generally parallel to one another.

With reference to FIG. 20, the first descender 360 and the first top extender 358 define a first top corner 398. Additionally, the first descender 360 and the first bottom extender 362 define a first bottom corner 400.

With reference to FIG. 19, the second descender 370 and the second top extender 368 define a second top corner 404. Additionally, the second descender 370 and the second bottom extender 372 define a second bottom corner 406.

With reference to FIG. 20, the third descender 380 and the third top extender 378 define a third top corner 410. Additionally, the third descender 380 and the third bottom extender 182 define a third bottom corner 412.

With reference to FIG. 19, the fourth descender 390 and the fourth top extender 388 define a fourth top corner 416. Additionally, the fourth descender 390 and the fourth bottom extender 192 define a fourth bottom corner 418.

Figure 29:
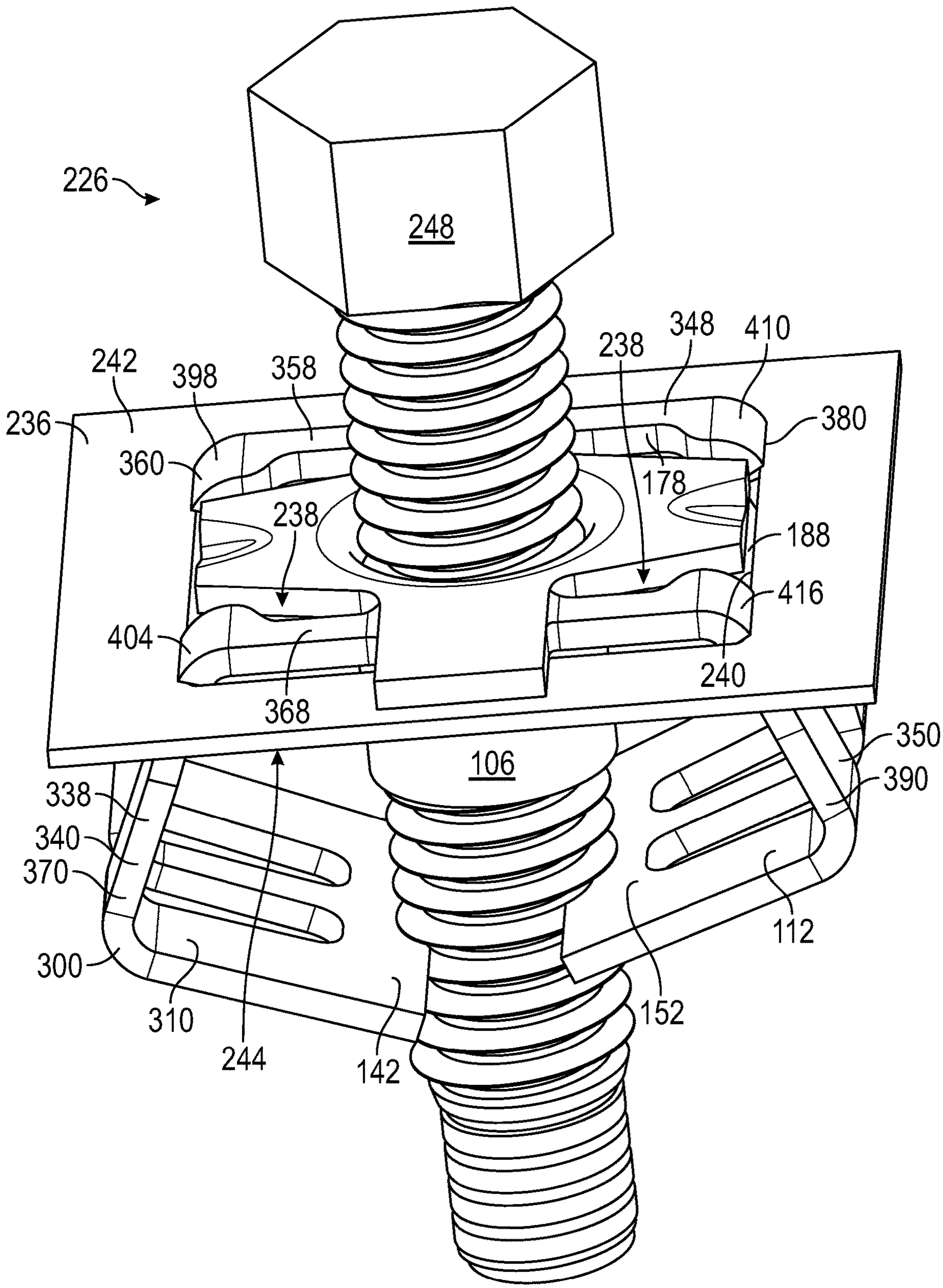
FIG. 29 is a side view of a second example assembly including the second example box nut retainer of FIGS. 17-28 installed in the panel of FIGS. 10-16 and 26-28 utilized with the fastener of FIGS. 14-16.
Figure 30:
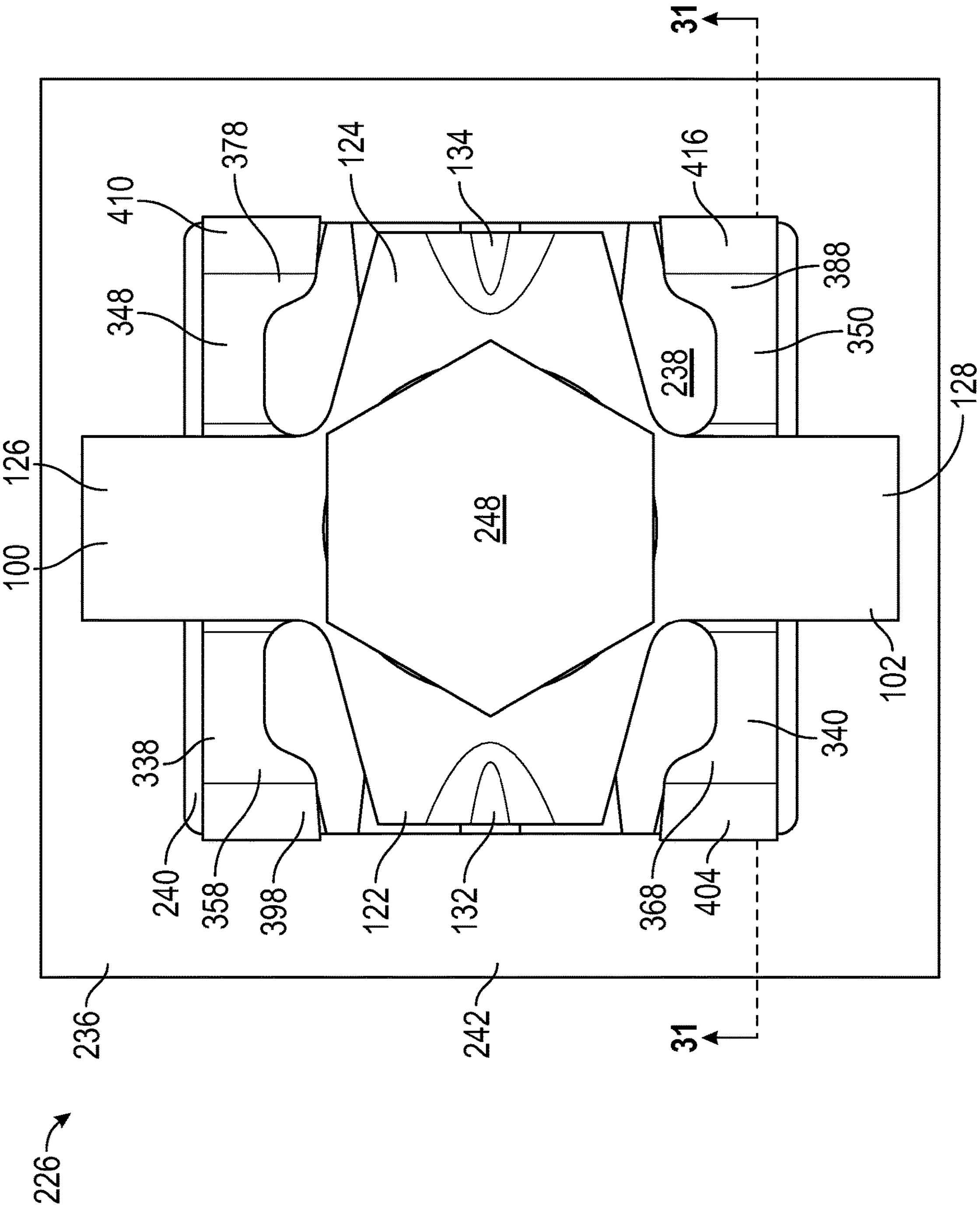
FIG. 30 is a bottom view of the second example assembly of FIG. 29.
Figure 31:
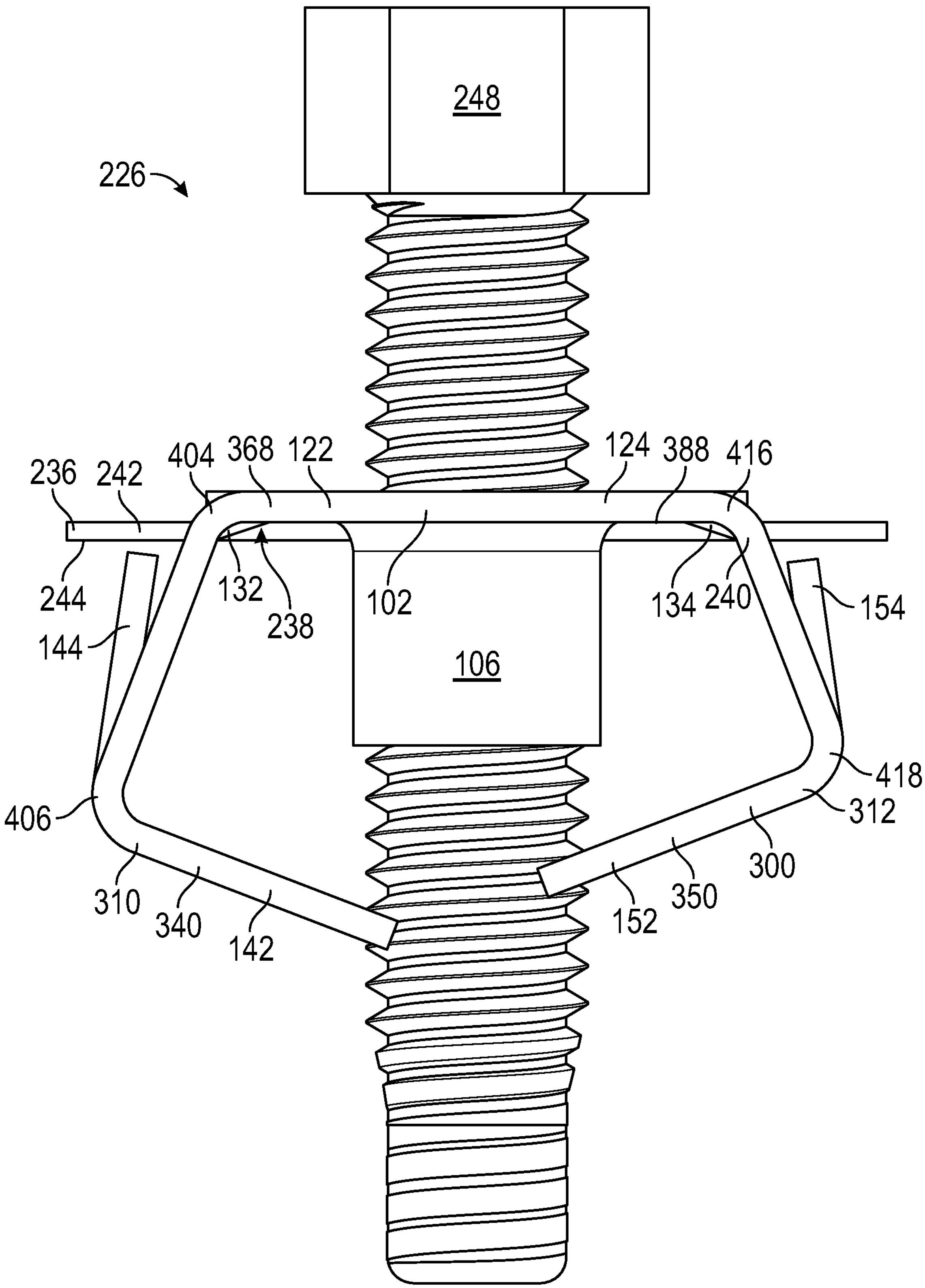
FIG. 31 is a cross-sectional view of the second example assembly of FIGS. 29 and 30 taken along line 31-31 of FIG. 30.

With reference to FIGS. 17-28, the box nut retainer 300 is shown in a relaxed state 424. With reference to FIGS. 29-31, the box nut retainer 300 is shown in a deployed state 426. With reference to FIGS. 17-20 and 23-28, when the box nut retainer 300 is in the relaxed state 424, the first wing 310 and the second wing 312 overlap one another at an overlap region 432. With reference to FIGS. 17, 18, and 23-28 the overlap region 232 at least partially overshadows the opening 116. With reference to FIG. 19, when the box nut retainer 300 is in the relaxed state 424, the second top corner 404 is below the support 102 between the fastener sleeve 106 and the first tab 122. When the box nut retainer 300 is in the relaxed state 424, the fourth top corner 416 is below the support 102 between the fastener sleeve 106 and the second tab 124. With reference to FIG. 20, when the box nut retainer 300 is in the relaxed state 424, the first top corner 398 is below the support 102 between the fastener sleeve 106 and the first tab 122. When the box nut retainer 300 is in the relaxed state 424, the third top corner 410 is below the support 102 between the fastener sleeve 106 and the second tab 124.

Figure 26:
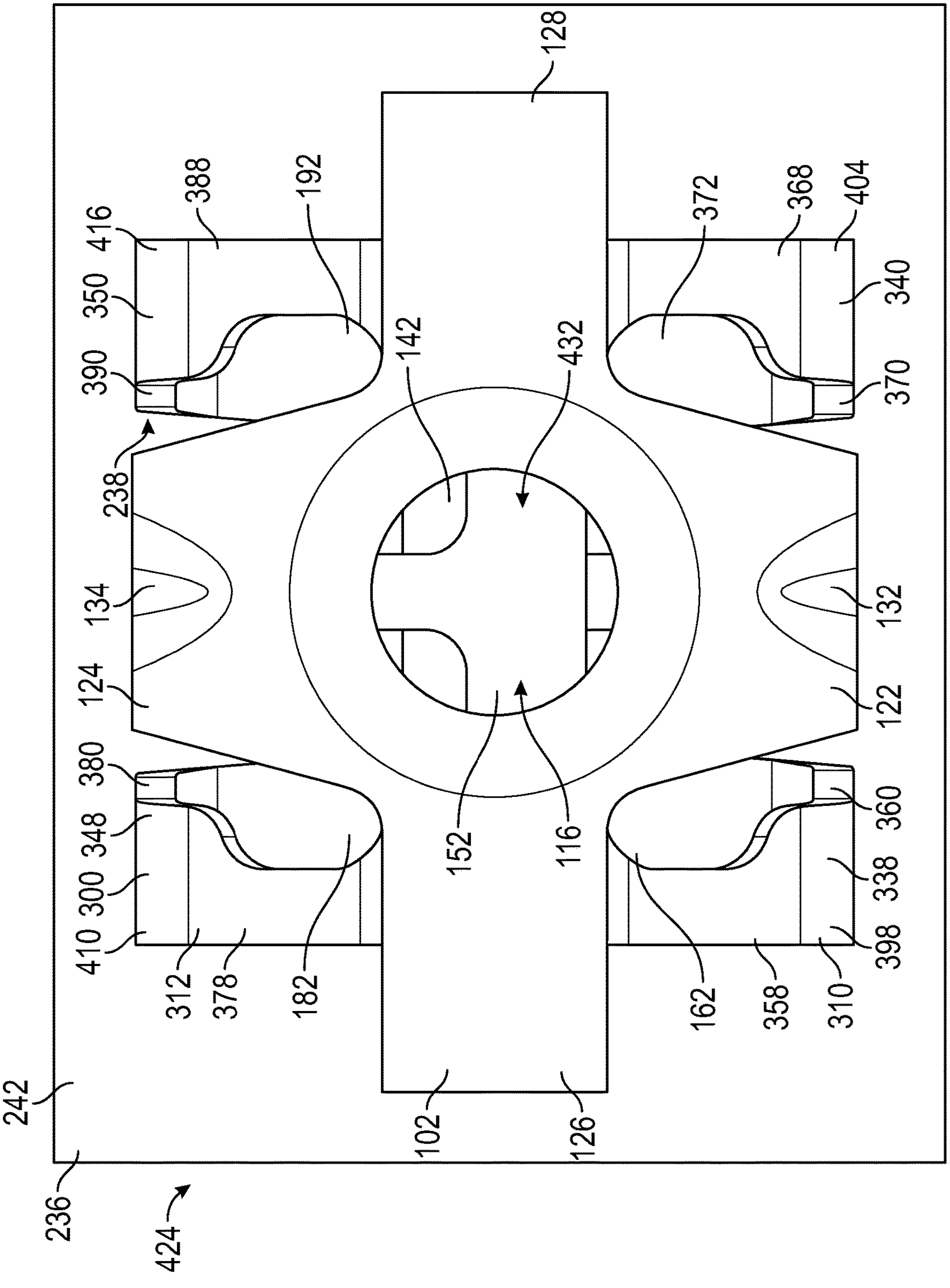
FIG. 26 is a top view of the second example box nut retainer of FIGS. 17-25 installed in the panel of FIGS. 10-16.
Figure 27:
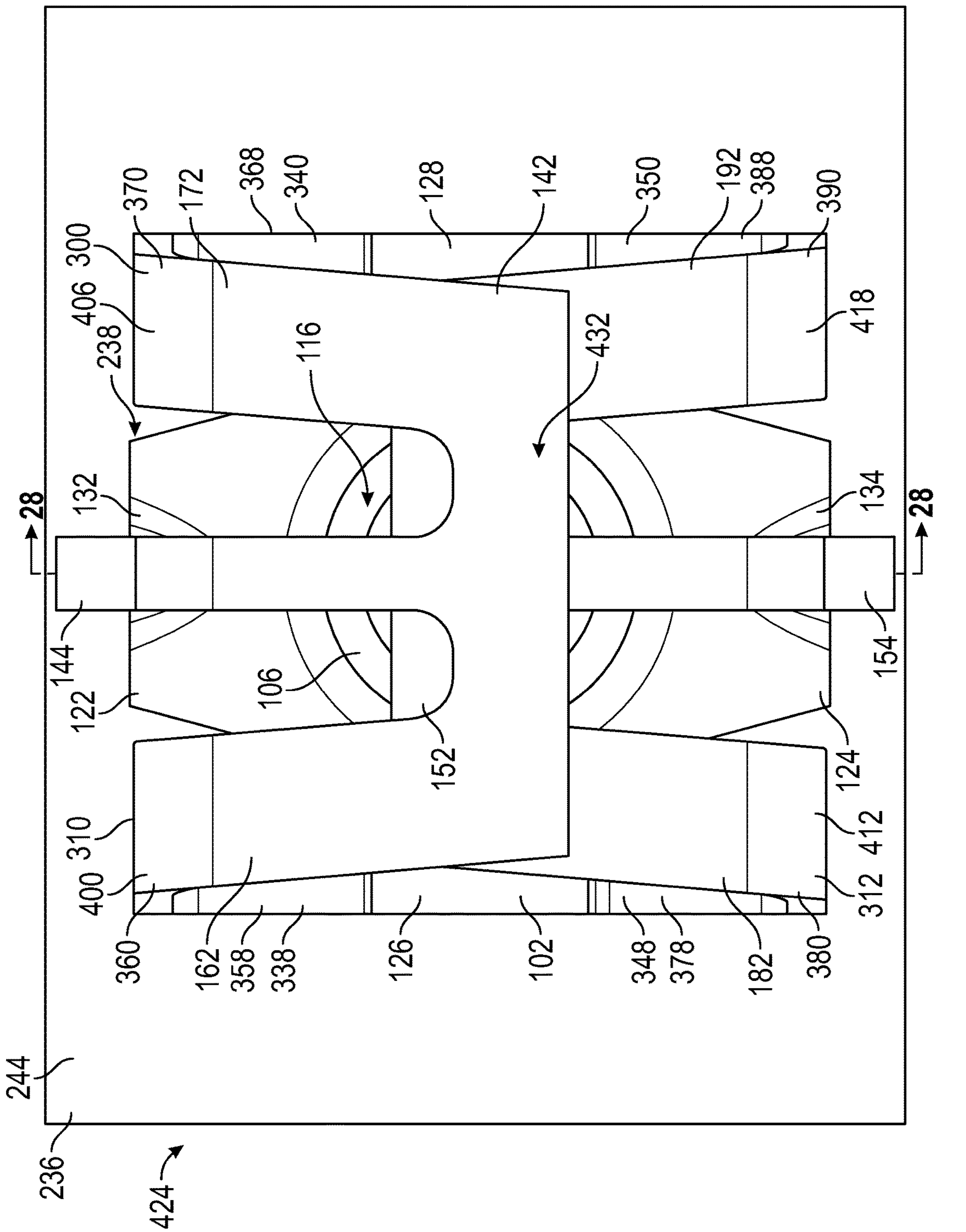
FIG. 27 is a bottom view of the second example box nut retainer of FIGS. 17-26 installed in the panel of FIGS. 10-16 and 26.
Figure 28:
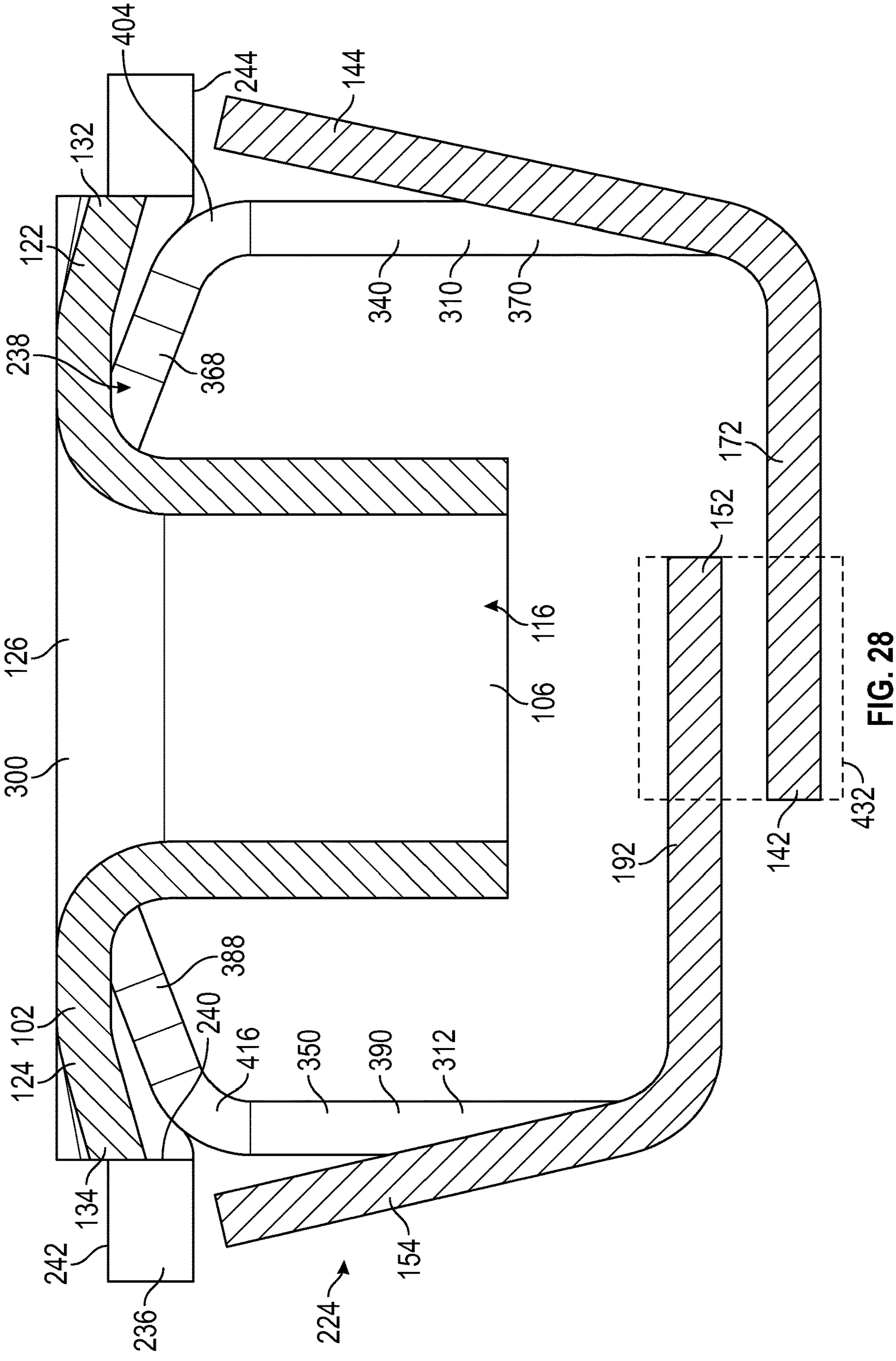
FIG. 28 is a cross-sectional view of the second example box nut retainer of FIGS. 17-27 installed in the panel of FIGS. 10-16, 26, and 27 taken along line 28-28 of FIG. 27.

With reference to FIGS. 26-28, the second example box nut retainer 300 is installed in the panel 236. The panel 236 is as described above.

With reference to FIGS. 29-31, the second example box nut retainer 300 is installed in the panel 236 and engaged with the fastener 248. The fastener 248 is as described above.

With reference to FIG. 26, in operation, when the second example box nut retainer 300 is installed into the panel 236, the support 102, the first wing 310, and the second wing 312 engage the panel 236. The box nut retainer 300 is introduced into the aperture 238 via the first wing 310 and the second wing 312.

With reference to FIG. 28, it should be understood that, in operation, the first snap arm 144 and the second snap arm 154 deflect inwardly toward the fastener sleeve 106 as the first wing 310 and the second wing 312 are inserted into the aperture 238. Once the first snap arm 144 and the second snap arm 154 clear the bottom surface 244, the first snap arm 144 and the second snap arm 154 resiliently snap outwardly away from fastener sleeve 106. Thus, the first snap arm 144 and the second snap arm 154 prevent the box nut retainer 300 from being pulled out of the aperture 238 of the panel 236. With reference to FIG. 26, the third tab 126 and the fourth tab 128 engage the top surface 242 to prevent the box nut retainer 300 from being pushed completely through the aperture 238 of the panel 236. In other words, the third tab 126, the fourth tab 128, the first snap arm 144, and the second snap arm 154 (shown in FIG. 28) transversely retain the box nut retainer 300 in the aperture 238 of the panel 236. It should be understood that when the box nut retainer 300 is installed in the panel 236 and in the relaxed state 224, the third tab 126, the fourth tab 128, the first snap arm 144, and the second snap arm 154 (shown in FIG. 28) loosely retain the box nut retainer 300 in the aperture 238 of the panel 236.

With reference to FIGS. 26-28, the first wing 310, the second wing 312, the first tab 122, and the second tab 124 engage the walls 240 of the panel 236. More specifically, with reference to FIG. 28, when the box nut retainer 300 is installed in the panel 236, the first retaining dip 132 and the second retaining dip 134 are partially disposed between the top surface 242 and the bottom surface 244 to abuttingly engage the walls 240. Further, the second top extender 368 and the fourth top extender 388 are disposed between the top surface 242 and the bottom surface 244 to abuttingly engage the walls 240. Additionally, with reference to FIG. 26, the first top extender 358 and the third top extender 378 are disposed between the top surface 242 and the bottom surface 244 (shown in FIG. 28) to abuttingly engage the walls 240. Thus, the first retaining dip 132, the second retaining dip 134, the first top extender 358, the second top extender 368, the third top extender 378, and the fourth top extender 388 prevent the box nut retainer 300 from sliding relative to the panel 236. In other words, the support 102, the first wing 310, and the second wing 312 laterally retain the box nut retainer 300 in the aperture 238 of the panel 236.

With reference to FIG. 28, when the box nut retainer 300 is installed in the panel 236 and in the relaxed state 424, the second top corner 404 and the fourth top corner 216 are aligned with the bottom surface 244. Additionally, with reference to FIG. 27, when the box nut retainer 300 is installed in the panel 236 and in the relaxed state 224, the first top corner 398 and the third top corner 410 are aligned with the bottom surface 244.

With reference to FIG. 29, further in operation, as the fastener 248 is threaded into the fastener sleeve 106, the fastener 248 initially contacts the second wing 312 and subsequently contacts the first wing 310. As the fastener 248 is threadingly driven against the first wing 310 and the second wing 312, the first wing 310 and the second wing 312 pivot relative to the support to deflect outwardly away from the fastener sleeve 106 into the deployed state 426. More specifically, the first leg 338, the second leg 340, the third leg 348, and the fourth leg 350 bend upwardly toward the bottom surface 244. When the box nut retainer 300 is in the deployed state 426, the first top corner 398, the second top corner 404, the third top corner 410, and the fourth top corner 416 are pushed out of the aperture 238 beyond the top surface 242 to align with the support 102. Thus, with reference to FIGS. 29 and 31, when the box nut retainer 300 is in the deployed state 426, the second descender 370 and the fourth descender 390 contact the walls 240 and the bottom surface 244. With reference to FIG. 29, the first descender 360 and the third descender 380 also contact the walls 240 and the bottom surface 244. In other words, as the first wing 310 and the second wing 312 deploy under pressure applied by the fastener 248, the first descender 360, the second descender 370, the third descender 380, and the fourth descender 390 are driven against the walls 240 and the bottom surface 244 to draw the third tab 126 and the fourth tab 128 against the top surface 242. Thus, when the box nut retainer 300 is installed in the panel 236 and in the deployed state 226, the third tab 126, the fourth tab 128, the first wing 310, and the second wing 312 tightly retain the box nut retainer 300 in the aperture 238 of the panel 236. In other words, when the box nut retainer 100 is installed in the panel 236 and in the deployed state 226, the panel 236 is clamped between the support 102 and the first wing 310 and between the support 102 and the second wing 312.

With reference to FIGS. 29-31, it should be understood that additional components (e.g., a second panel, a wiring harness, a brake line router, etc.) (not shown) may be used with the fastener 248. The fastener 248 may be driven into the box nut retainer 300 to robustly attach the additional components to the panel 236.

As used herein, panel may refer to any component that may be attached or assembled to another component. Any of the panels described herein may be made of any suitable material, for example, a metal or plastic material.

Embodiments of the present disclosure provide a fastening system, and, more particularly, a box nut retainer system that is configured to securely connect multiple components together. The box nut retainer system includes opposing wings with top corners between a support and a fastener sleeve, which direct the wings to engage with a bottom surface of a panel while the support clamps against a top surface of the panel.

From the foregoing, it will be appreciated that the above first and second example box nut retainers 100, 300 adapt to clampingly engage top and bottom surfaces of substrate panels. Thus, the box nut retainers 100, 300 may be used with relatively thin substrates. Because the box nut retainers 100, 300 may be used with relatively thin substrate panels, the relatively thin and thus lighter substrate panels may be used in a wider variety of applications. Thus, a vehicle produced using the box nut retainers 100, 300 and thinner, lighter substrate panels may be lighter than existing vehicles. Thus, the above-disclosed box nut retainer 100 conserves resources and may improve vehicle fuel efficiency as compared to existing fasteners.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A box nut retainer, comprising:

a support, the support defining a first tab and a second tab opposite the first tab, a third tab and a fourth tab opposite the third tab, the first tab and second tab perpendicular to the third tab and the fourth tab;

a fastener sleeve defining an opening and extending downwardly from the support; and a wing extending from the support and having a top corner between the support and the fastener sleeve, wherein the first tab and the second tab include a retaining dip.

2. The box nut retainer of claim 1, wherein the wing has a top extender connected to the support and extending between the support and the fastener sleeve.

3. The box nut retainer of claim 2, wherein the wing has a descender connected to the top extender, the top extender and the descender defining the top corner.

4. The box nut retainer of claim 1, wherein the fastener sleeve is internally threaded.

5. The box nut retainer of claim 1, wherein the wing has a snap arm extending toward the support.

6. The box nut retainer of claim 5, wherein the snap arm extends beyond the support.

7. The box nut retainer of claim 5, wherein the snap arm is L-shaped.

8. The box nut retainer of claim 5, wherein the snap arm pivots resiliently relative to a leg of the wing.

9. The box nut retainer of claim 1, wherein the wing partially overshadows the opening.

10. The box nut retainer of claim 1, wherein the wing is C-shaped.

11. The box nut retainer of claim 1, wherein the wing is a first wing and further comprising a second wing extending from the support and overlapping the first wing.

12. The box nut retainer of claim 1, wherein the first tab and the second tab is shorter than the third tab and the fourth tab.

13. The box nut retainer of claim 1, wherein:

the top corner is a first top corner, the wing has a first leg connected to a second leg, the first leg includes the first top corner, and the second leg includes a second top corner.

14. The box nut retainer of claim 1, wherein the wing is configured to deploy against a bottom surface of a panel to draw the support against a top surface of the panel.

15. A box nut retainer, comprising:

a support;

a fastener sleeve defining an opening and extending downwardly from the support; and a wing having a kink extending curvilinearly from the support to a top corner between the support and the fastener sleeve.

16. The box nut retainer of claim 15, wherein the wing has a descender connected to the kink, the kink and the descender defining the top corner.

17. The box nut retainer of claim 15, wherein the wing pivots relative to the support via the kink.

18. A box nut retainer, comprising:

a support;

a fastener sleeve defining an opening and extending downwardly from the support; and a wing having a top extender extending diagonally from the support to a top corner between the support and the fastener sleeve.

19. The box nut retainer of claim 18, wherein:

the wing has a descender connected to the top extender via the top corner, and the wing is configured to pivot relative to the support to drive the descender against a bottom surface of a panel to draw the support against a top surface of the panel.

* * * * *